US012551238B2

(12) United States Patent
Dacosta et al.

(10) Patent No.: US 12,551,238 B2
(45) Date of Patent: Feb. 17, 2026

(54) FIBER IMPLANT WITH INTERWOVEN DIFFERENT MATERIALS

(71) Applicant: Paragon 28, Inc., Englewood, CO (US)

(72) Inventors: Albert Dacosta, Lone Tree, CO (US); Randall Allard, Golden, CO (US); Sean Gill, Denver, CO (US); Paul Devasconcellos, Parker, CO (US); Kyle Hartson, Denver, CO (US)

(73) Assignee: Paragon 28, Inc., Englewood, CO (US)

( * ) Notice: Subject to any disclaimer, the term of this patent is extended or adjusted under 35 U.S.C. 154(b) by 513 days.

(21) Appl. No.: 17/805,597

(22) Filed: Jun. 6, 2022

(65) Prior Publication Data

US 2022/0296276 A1 Sep. 22, 2022

Related U.S. Application Data

(63) Continuation of application No. PCT/US2020/070866, filed on Dec. 4, 2020.

(60) Provisional application No. 62/944,728, filed on Dec. 6, 2019.

(51) Int. Cl.
*A61B 17/56* (2006.01)
*A61B 17/00* (2006.01)

(52) U.S. Cl.
CPC .... *A61B 17/56* (2013.01); *A61B 2017/00004* (2013.01); *A61B 2017/00862* (2013.01); *A61B 2017/00867* (2013.01); *A61B 2017/564* (2013.01); *A61B 2017/567* (2013.01)

(58) Field of Classification Search
CPC .... A61B 2017/567; A61B 2017/00004; D04C 1/06; A61F 2/90; A61F 2250/003; A61F 2250/0037; A61F 2/08; A61F 2220/0041; A61F 2250/0069; A61F 2/856
USPC ...................................... 139/387 R
See application file for complete search history.

(56) References Cited

U.S. PATENT DOCUMENTS

| 3,945,052 | A | 3/1976 | Liebig | |
|---|---|---|---|---|
| 4,795,466 | A | 1/1989 | Stuhmer | |
| 5,376,118 | A | 12/1994 | Kaplan | |
| 6,086,968 | A | * 7/2000 | Horovitz | D03D 3/00 139/387 R |
| 6,513,530 | B2 | 2/2003 | Knudson | |
| 6,599,319 | B2 | 7/2003 | Knudsen | |

(Continued)

FOREIGN PATENT DOCUMENTS

| DE | 102012016301 B3 | * 12/2013 | ............... A61F 2/06 |
|---|---|---|---|
| GB | 2537052 A | * 10/2016 | ............... A61F 2/08 |

OTHER PUBLICATIONS

Abstract translation for DE10201201630 (Year: 2013).*

(Continued)

*Primary Examiner* — Brian E Pellegrino
(74) *Attorney, Agent, or Firm* — Heslin Rothenberg Farley & Mesiti P.C.; Jacquelyn A. Graff, Esq.

(57) ABSTRACT

Implants, and surgical methods are disclosed herein. The implant includes a first fiber population that includes at least one non-resorbable fiber and an arrangement of non-resorbable fibers that includes a plurality of gaps between portions of the at least one non-resorbable fiber. Further, the implant includes a second fiber population that includes at least one resorbable fiber and an arrangement of resorbable fibers that includes a positioning of the at least one resorbable fiber that traverses the plurality of gaps.

20 Claims, 23 Drawing Sheets

(56) References Cited

U.S. PATENT DOCUMENTS

| | | |
|---|---|---|
| 2004/0210318 A1 | 10/2004 | Conrad |
| 2005/0043733 A1 | 2/2005 | Eisermann |
| 2005/0288797 A1 | 12/2005 | Howland |
| 2007/0282160 A1 | 12/2007 | Sheu |
| 2010/0298937 A1 | 11/2010 | Laurencin |
| 2011/0021869 A1 | 1/2011 | Cholhan |
| 2012/0191180 A1* | 7/2012 | Hartley ............... A61F 2/07 623/1.35 |
| 2014/0035183 A1* | 2/2014 | Scherrible ............ A61F 2/90 264/103 |
| 2019/0231511 A1 | 8/2019 | Winner et al. |

OTHER PUBLICATIONS

International Search Report and Written Opinion of the International Searching Authority for PCT/US2020/070866, Apr. 1, 2021, 27 pages.

Beumer, A. et al., "A Biomechanical Evaluation of the Tibiofibular and Tibiotalar Ligaments of the Ankle," Foot & Ankle International, vol. 24, No. 5, pp. 426-429, May 2003.

* cited by examiner

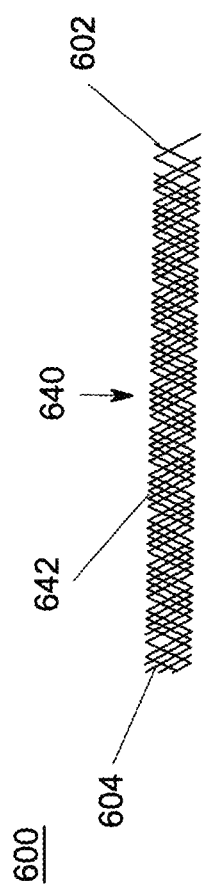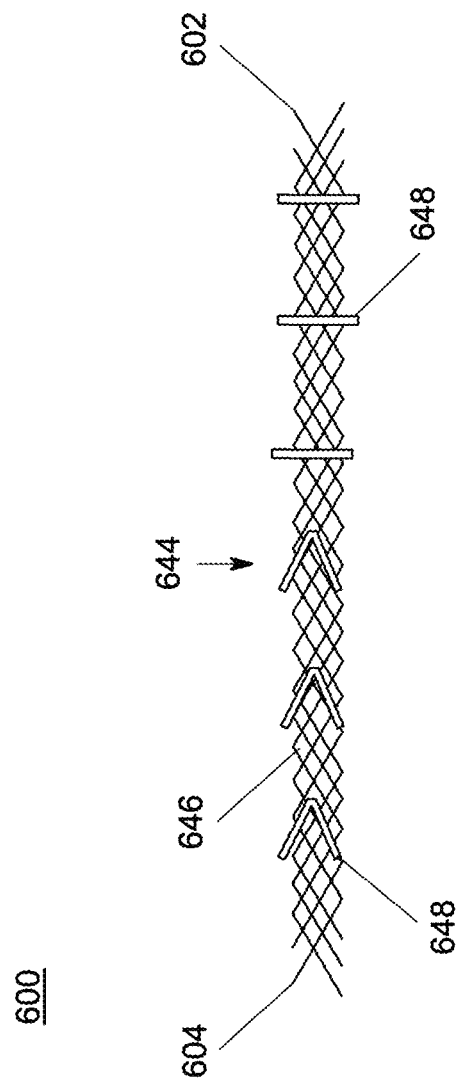

//FIBER IMPLANT WITH INTERWOVEN DIFFERENT MATERIALS

CROSS-REFERENCE TO RELATED APPLICATION

This application is a continuation of PCT Application No. PCT/US2020/070866 filed Dec. 4, 2020, and entitled "Implant and Related Methods," which claims priority benefit under 35 U.S.C. § 119(e) of U.S. provisional application No. 62/944,728 filed Dec. 6, 2019, which are incorporated herein by reference in their entireties.

TECHNICAL FIELD

The present invention relates generally to general surgery, orthopedics, and implants. More specifically, but not exclusively, the present invention relates to implants, and surgical methods to facilitate musculoskeletal repair.

BACKGROUND

Injuries to portions (e.g., joints) of a musculoskeletal system may require surgical intervention in order to repair the damage and facilitate proper physiological healing. Commonly, implants are surgically inserted into a patient to provide musculoskeletal support and facilitate proper healing. To promote proper healing and recover biomechanical function of the joint, it may be desired to have an initial period of relatively little physiological motion, followed gradual increases in motion over time.

Currently available implants, systems, and methods for repair and stabilization of joints may provide inadequate musculoskeletal support throughout the healing process as the musculoskeletal system gradually regains in-situ biomechanical function. Accordingly, there remains a need for improved implants, and surgical methods to address these inadequacies.

SUMMARY

Aspects of the present invention provide implants, and surgical methods for providing biomechanical support to facilitate proper healing of a damaged joint.

In one aspect, provided herein is an implant that includes a first fiber population that includes at least one non-resorbable fiber and an arrangement of non-resorbable fibers that includes a plurality of gaps between portions of the at least one non-resorbable fiber. Further, the implant includes a second fiber population that includes at least one resorbable fiber and an arrangement of resorbable fibers that includes a positioning of the at least one resorbable fiber that traverses the plurality of gaps.

Also provided herein is a surgical method. The surgical method includes obtaining an implant, making an incision to expose a portion of a patient's musculoskeletal system, and preparing the portion of the patient's musculoskeletal system for receiving the implant. Further, the surgical method includes coupling the first end of the implant to at least one element of the patient's musculoskeletal system, coupling the second end of the implant to at least one element of the patient's musculoskeletal system, and closing the incision.

These, and other objects, features and advantages of this invention will become apparent from the following detailed description of the various aspects of the invention taken in conjunction with the accompanying drawings.

BRIEF DESCRIPTION OF THE DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention. It is emphasized that, in accordance with the standard practice in the industry, various features are not drawn to scale. In fact, the dimensions of the various features may be arbitrarily increased or reduced for clarity of discussion. The foregoing and other objects, features and advantages of the invention are apparent from the following detailed description taken in conjunction with the accompanying drawings in which:

FIG. 15A is an illustrated front view of an exemplary implant with an approximate 30-degree weave angle prior to resorption;

FIG. 15B is a front view illustrating the implant of FIG. 15A post-resorption, in accordance with the present disclosure;

DETAILED DESCRIPTION

Figure 1:
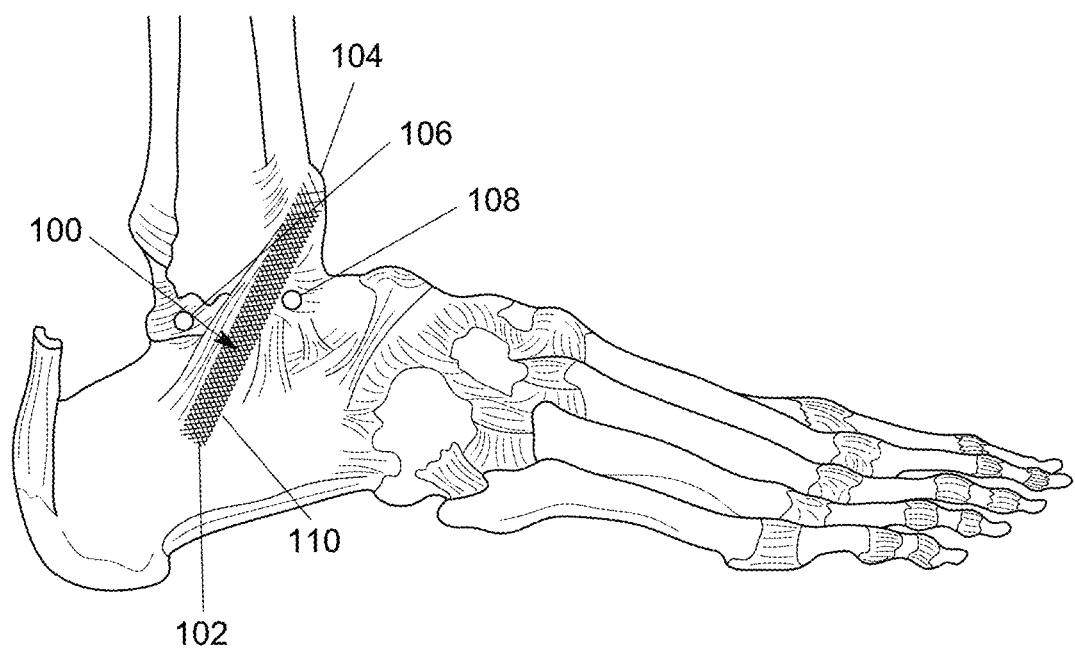
FIG. 1 is a perspective view illustrating an implant implanted within a patient, in accordance with an aspect of the present invention.

In this detailed description and the following claims, the words proximal, distal, anterior or plantar, posterior or dorsal, medial, lateral, superior and inferior are defined by their standard usage for indicating a particular part or portion of a bone or implant according to the relative disposition of the natural bone or directional terms of reference. For example, "proximal" means the portion of a device or implant nearest the torso, while "distal" indicates the portion of the device or implant farthest from the torso. As for directional terms, "anterior" is a direction towards the front side of the body, "posterior" means a direction towards the back side of the body, "medial" means towards the midline of the body, "lateral" is a direction towards the sides or away from the midline of the body, "superior" means a direction above and "inferior" means a direction below another object or structure.

Similarly, positions or directions may be used herein with reference to anatomical structures or surfaces. For example, as the current implants, devices, instrumentation and methods are described herein with reference to use with the bones of the foot, the bones of the foot, ankle and lower leg may be used to describe the surfaces, positions, directions or orientations of the implants, devices, instrumentation and methods. Further, the implants, devices, instrumentation and methods, and the aspects, components, features and the like thereof, disclosed herein are described with respect to one side of the body for brevity purposes. However, as the human body is relatively symmetrical or mirrored about a line of symmetry (midline), it is hereby expressly contemplated that the implants, devices, instrumentation and methods, and the aspects, components, features and the like thereof, described and/or illustrated herein may be changed, varied, modified, reconfigured or otherwise altered for use or association with another side of the body for a same or similar purpose without departing from the spirit and scope of the invention. For example, the implants, devices, instrumentation and methods, and the aspects, components, features and the like thereof, described herein with respect to the right foot may be mirrored so that they likewise function with the left foot. Further, the implants, devices, instrumentation and methods, and the aspects, components, features and the like thereof, disclosed herein are described with respect to the foot for brevity purposes, but it should be understood that the implants, devices, instrumentation and methods may be used with other bones of the body having similar structures.

Generally stated, disclosed herein are implants, and surgical methods for repairing damaged portions of joints. The implants, and surgical methods may be illustrated and described in the present disclosure in the context of soft tissue repair, although the implants, and surgical methods may equally be employed or may be adapted without undue experimentation to facilitate repair of any joint, any soft tissue to soft tissue connection, any soft tissue to bone connection, and any bone to bone connection. For example, the implants, and surgical methods may be equally employed to repair/join any other tissue and/or bone segments or any other parts of a human and/or animal musculoskeletal system. In one embodiment, the implant described herein may be capable of assisting in proper physiological healing of damaged tissue of and/or near a joint of the musculoskeletal system. For example, soft tissue may be come attenuated, tear, or otherwise become segmented in the body.

Proper physiological healing of damaged soft tissue (e.g., muscles, tendons, ligaments, fascia, fibrous tissues, etc.) may be fast or slow depending on the individual and the severity of the damage. However, the healing process generally includes an initial period of stabilization to facilitate proper recovery to the organizational and structural arrangement of the soft tissue. Generally during this initial period of stabilization, limited in-situ motion between the healing musculoskeletal structures may be desired to allow fibroblasts to deposit new fibers into the area to help heal the damaged soft tissue. This initial period most often lays down fibers in a random, non-oriented fashion that is often referred to as scar tissue. At the conclusion of this initial period, it is often desired to limit physiological motion to allow the musculoskeletal system to gradually adapt and remodel to replace the initial scar tissue with more structurally rigid fibers that may be needed to regain appropriate biomechanical functionality. However, the adaptation and remodeling process often involves several phases during which the new fibers deposited by the fibroblasts become more specific to support various stresses to the damaged tissue. Eventually, the damaged tissue will have an elasticity that is compatible with elasticity of surrounding tissue so that flexibility of the damaged tissue is not substantially restricted. Surgical intervention may be desired in order to facilitate proper physiological healing during this process. For instance, implants such as those described herein may be inserted into a patient to increase the likelihood that proper physiological healing will occur during these various healing phases.

With reference to the drawings, wherein like reference numerals are used to indicate like or analogous components throughout the several views, and with particular reference to FIGS. 1-17B, various implants are depicted, in accordance with an aspect of the present invention. Referring to FIG. 1, the implant 100 may be capable of facilitating proper physiological healing of damaged portions (e.g., tissue and/or bones) of a patient's joint. In particular, the implant 100 may facilitate healing to tissues such as a patient's posterior talofibular ligament 106, anterior talofibular ligament 108, and/or calcaneofibular ligament 110. The implant 100 may be attached/coupled to the patient at a first end 102 of the implant 100 and/or a second end 104 of the implant 100.

Figure 2:
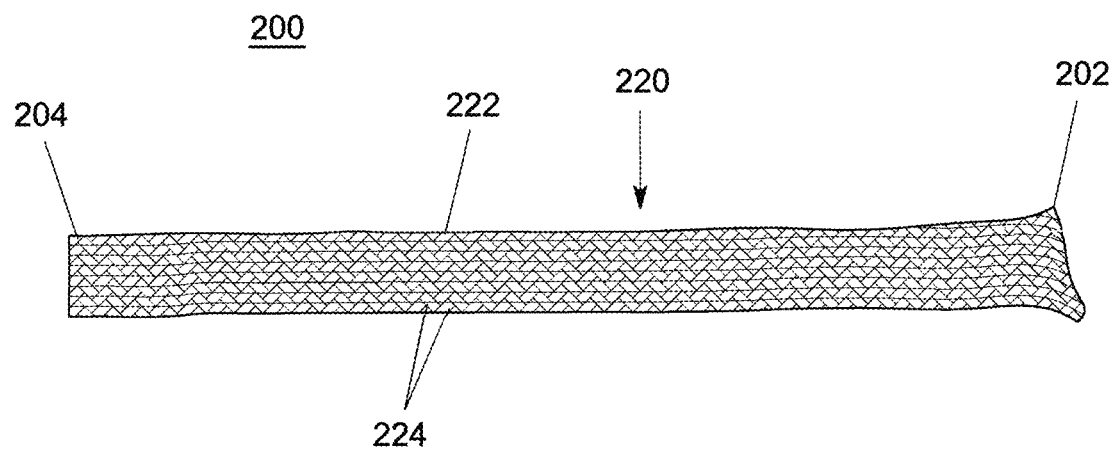
FIG. 2 is a front view of an exemplary implant, in accordance with the present disclosure.

FIG. 2 provides a front view of an exemplary implant 200, in accordance with the present disclosure. The implant 200 may include a first fiber population 224 and a second fiber population 222. The first fiber population 224 includes at least one non-resorbable fiber, and the second fiber population 222 includes at least one resorbable fiber.

The second fiber population 222 and/or the first fiber population 224 may be dyed, stained, patterned, coated, colored or distinguished in such a way as to enable medical professionals and/or others to distinguish the second fiber population 222 from the first fiber population 224 in the weave pattern.

According to various embodiments, the second fiber population 222 and/or the first fiber population 224 of the implant 200 may be monofilaments, multifilaments, or combinations thereof. According to one embodiment, the second fiber population 222 and the first fiber population 224 may be woven into a network of interwoven fibers 220 that have a capacity to resist dissociation. According to various invention embodiments, the network of interwoven fibers 220 may be woven to form, for example, a ribbon-like, tape-like, band-like, or other similarly configured constructs. Further, according to one embodiment, the network of interwoven fibers 220 may provide a flexible, collapsible, deformable, bendable, loose, pliable, elastic, adaptable, stretchable and/or otherwise rearrangeable composition to the implant 200.

The network of interwoven fibers 220 may include at least one weave pattern traversing at least a portion of a longitudinal length, from the first end 202 to the second end 204, of the implant 200. For example, the weave pattern of implant 200 provides an appearance of alternating the second fiber population 222 and the first fiber population 224 going from the first end 202 to the second end 204.

The at least one weave pattern may be formed, for example, by braiding, knitting, flat weaving, and/or another joining process. Further, the network of interwoven fibers 220 may also be formed using a technique that does not include weaving, per se, but uses a non-woven processing technique, such as, for example, meltblowing, dry spinning or electrospinning or other non-woven processing technique, that may provide the interwoven configuration. Additionally, the at least one weave pattern may cover substantially all, or portions of the longitudinal length of the implant 200. For example, the implant 200 may also include portions and/or segments without a weave pattern that may be striated, twisted, laminated, etc.

The weave pattern may be any of a variety of weave patterns such as, for example, a 3/1 twill weave, a 2/2 herringbone twill, threaded twill, and/or various other warp/weft twill patterns, a plain/tabby weave, a satin weave, a pile weave, a jacquard weave, a dobby weave, gauze weave, a matt/basket weave, a rib weave, a crepe weave, braiding, matte spinning, felting, and/or modifications and/or combinations thereof. Additionally, the weave pattern may include one weave pattern along one portion of the implant 200, and then have another, different weave pattern along another portion of the implant 200. In other examples, the implant 200 may include a weave pattern for only portions of the length of the implant 200 in addition to non-weaved portions. Various other weave patterns are possible.

Figure 3:
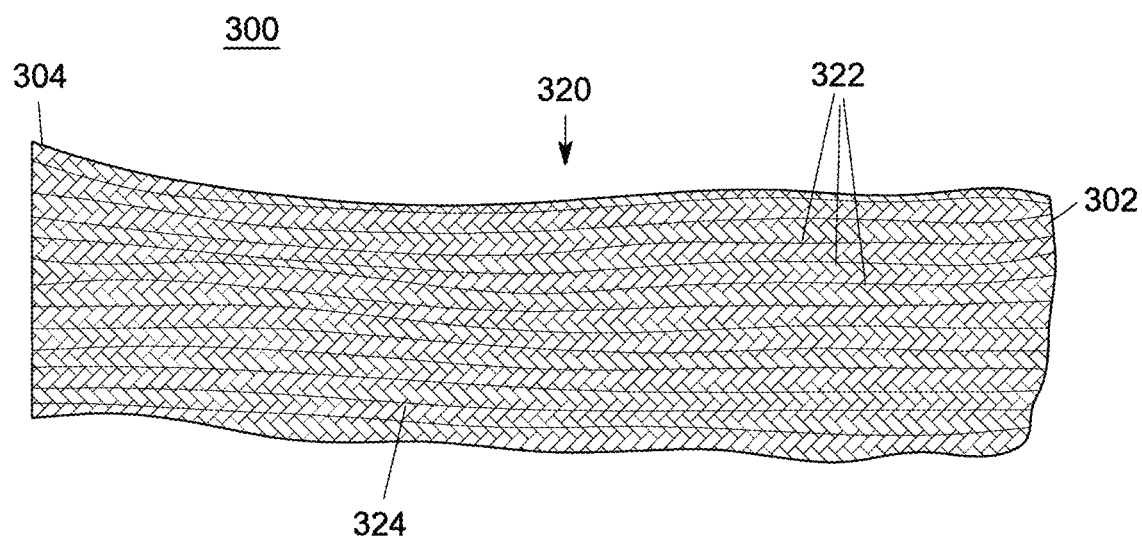
FIG. 3 is a front view of another exemplary implant, in accordance with the present disclosure.
Figure 4:
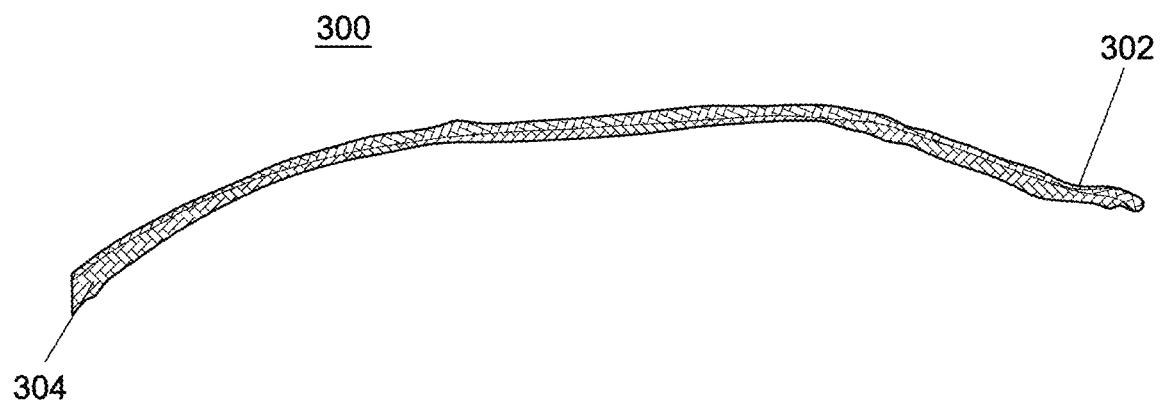
FIG. 4 is a top view of the implant of FIG. 3, in accordance with the present disclosure.
Figure 5:
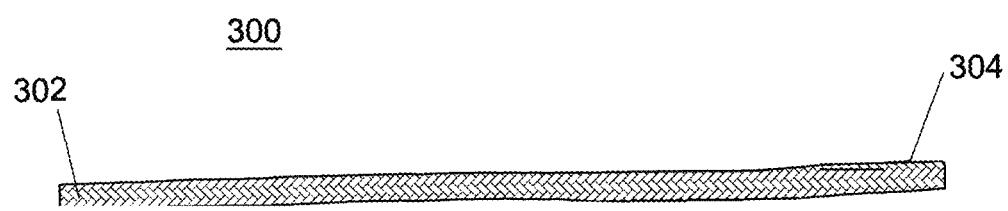
FIG. 5 is a bottom view of the implant of FIG. 3, in accordance with the present disclosure.
Figure 6:
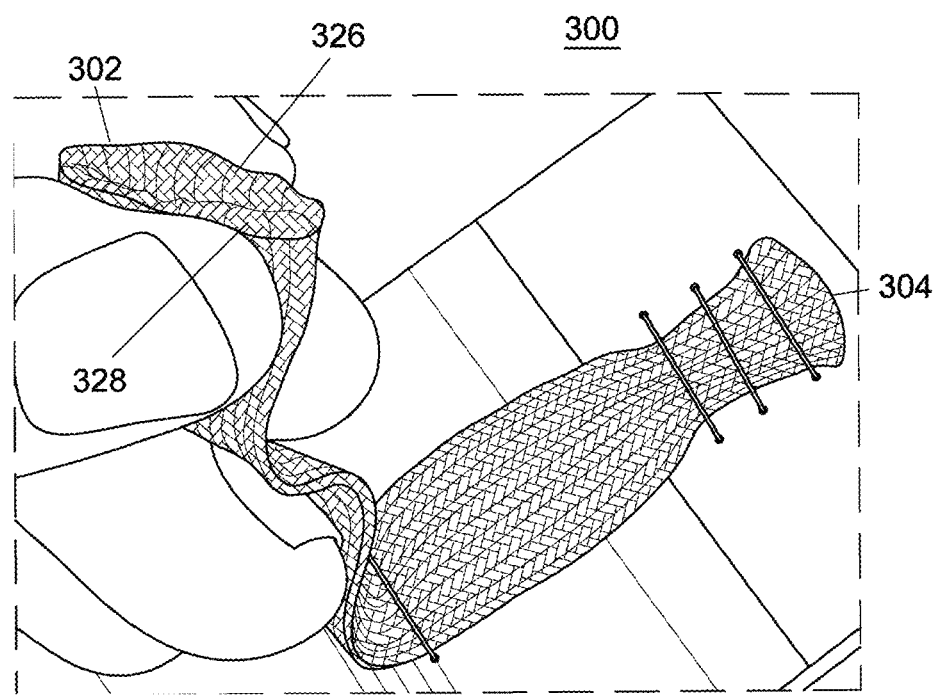
FIG. 6 is an end view of the implant of FIG. 3, in accordance with the present disclosure.
Figure 7:
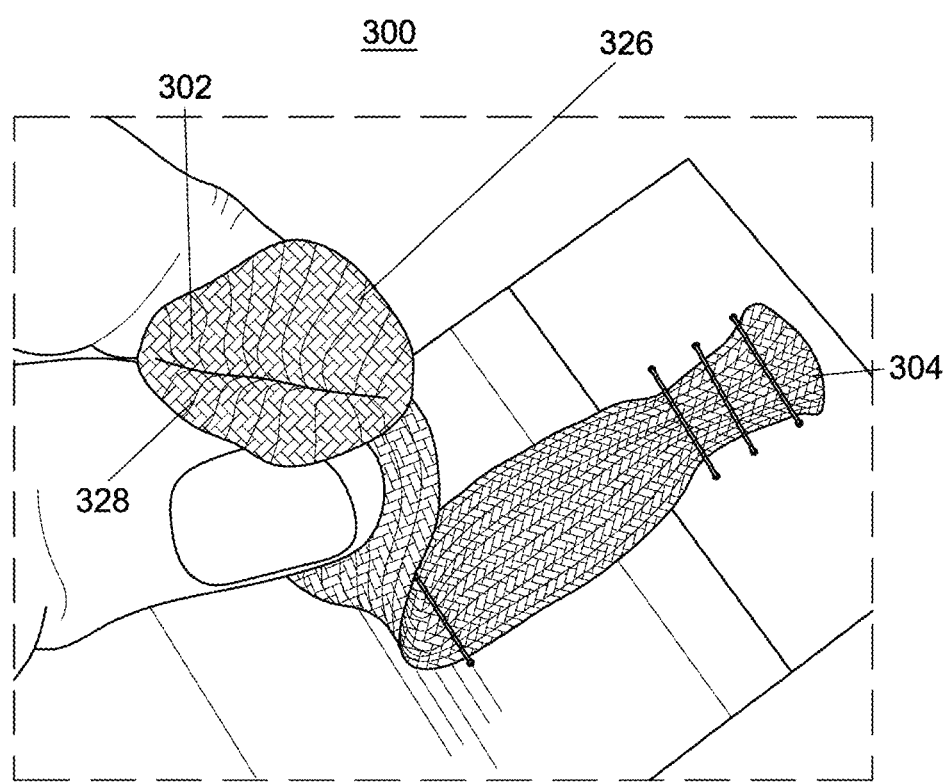
FIG. 7 is another end view of the implant of FIG. 3, in accordance with the present disclosure.
Figure 8:
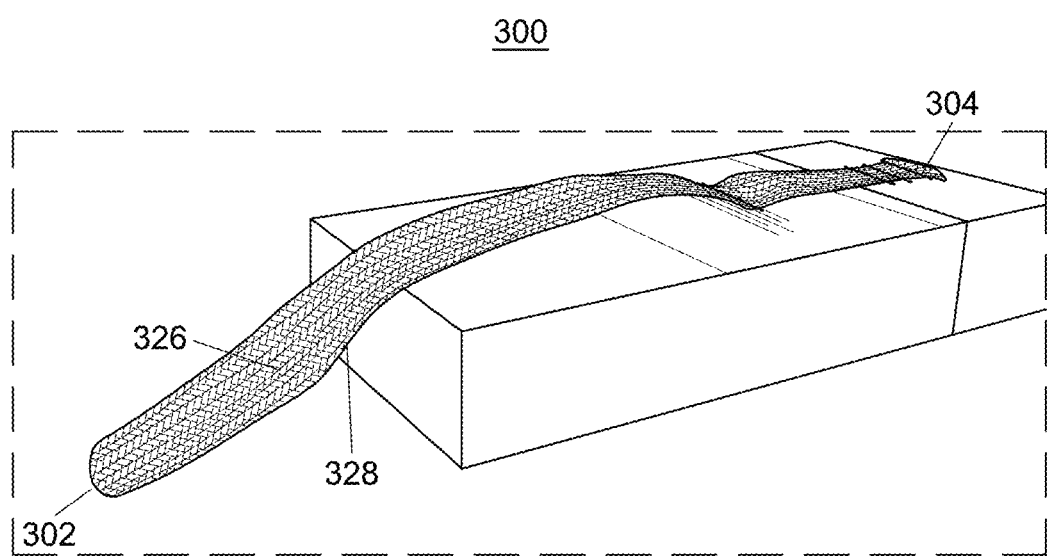
FIG. 8 is a front, top perspective view of the implant of FIG. 3, in accordance with the present disclosure.
Figure 9:
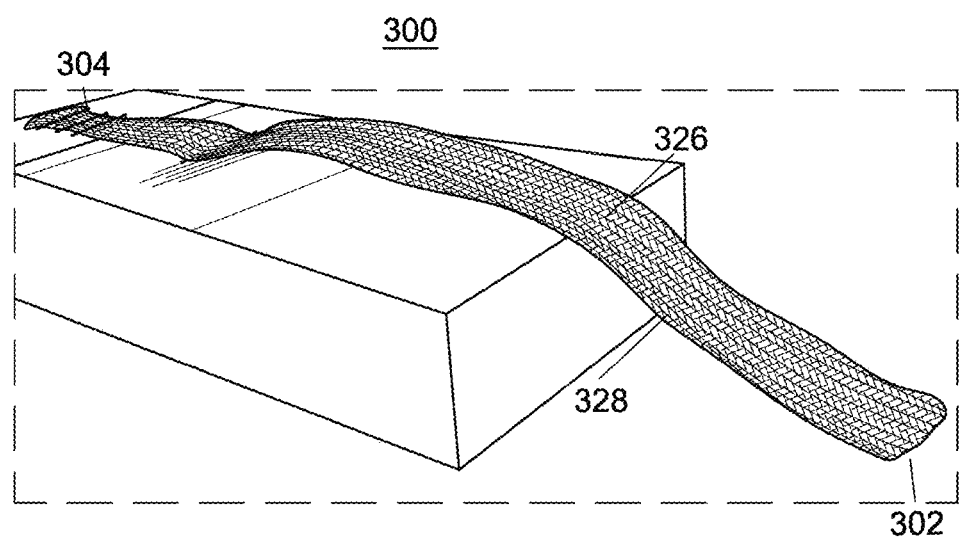
FIG. 9 is a back, top perspective view of the implant of FIG. 3, in accordance with the present disclosure.

For example, FIG. 3 provides a front view of another exemplary implant 300, in accordance with the present disclosure. Implant 300 may include a network of interwoven fibers 320 with a substantial majority of the first fiber population 324 interwoven with occasional sets of fibers of the second fiber population 322. Various implant ratios of the second fiber population 322 to the first fiber population 324 are possible. Further, the weave pattern of implant 300 may include a herringbone pattern extending from the first end 302 to the second end 304. Various other weave patterns may be implemented to produce similar ratios of the second fiber population 322 to the first fiber population 324.

According to one embodiment, the first fiber population 324 may, for example, include a non-resorbable-fiber length that is longer, from the first end 302 to the second end 304, than at least one resorbable-fiber length of the second fiber population 322. Other embodiments may include, for example, a first fiber population 324 that may be the same length as the second fiber population 322.

According to one embodiment, the weave pattern may include a dense arrangement of the first fiber population 324 and a sparse arrangement of the second fiber population 322. For instance, the weave pattern may include a same starting point (e.g., at the first end 302 of the implant 300), of the portion of the longitudinal length of the implant that may include the weave pattern, for both the second fiber population 322 and the first fiber population 324. Due to the weave pattern having a dense arrangement of the first fiber population 324 and a sparse arrangement of the second fiber population 322, both the second fiber population 322 and the first fiber population 324 may have a same ending point (e.g., at the second end 304 of the implant 300) of the portion of the implant 300 that has the weave pattern. Thus, even though the first fiber population 324 is longer than the second fiber population 322, the weave pattern may provide a same starting point and a same ending point for both the first fiber population 324 and the second fiber population 322.

FIGS. 4-12 provide various other views of the implant 300 of FIG. 3. The network of interwoven fibers 320 may be woven into various compositions such as, for example, a tubular composition (e.g., a substantially hollow sheath, sleeve, etc.) that extends along a longitudinal axis of the implant 300. The tubular composition may be flattened to have a planar configuration (e.g., ribbon form) such that the implant 300 may include two planar layers of fibers. The planar configuration may be capable of providing a visual appearance of a single layer of fibers due to the flattened, thin configuration. The tubular composition may, for example, provide additional resistance to dissociation for the interwoven fibers 320. Other woven compositions may be substantially solid. The planar configuration may include, for example, one substantially planar surface 326 (e.g., a front surface) and another substantially planar surface 328 (e.g., a back surface) that may include a broad transversal configuration of the at least one weave pattern. This broad transversal configuration may be capable of expanding along at least one planar surface 326, 328 during longitudinal compression of the implant, or be capable of contracting along the at least one planar surface 326, 328 during longitudinal tension of the implant 300. The first 302 end and/or second end 304 end of the implant 300 may be substantially closed (e.g., punctured and/or sealed as shown, for example, in FIGS. 6, 7). The implant 300 may also include various regions with different configurations. For example, one region of the implant 300 may include a tubular composition with a planar configuration (e.g., traversing one or more joints of the patient), and another region of the implant 300 may include a substantially solid composition with a rounded configuration (e.g., attached to an anchor fixating the implant to a bone of the patient). Other spacing and layering configurations are contemplated.

The dimensions of the implant 300 will vary depending on the specific application. The implant 300 may include an initial resting width of 1 mm to 10 mm; however, this initial resting width may vary when tension is applied to the implant 300. For example, the implant 300 may become narrower and have a smaller width than the initial resting width when tension is applied longitudinally. Further, the implant 300 may become wider and have a larger width than the initial resting width when longitudinal compression is applied to the implant 300. Additionally, the implant may also include substantially smaller widths at predetermined positions of the implant in order to anchor the implant through, for example, an eyelet of an anchor.

In one embodiment, the implant 300 may have an initial resting length of 180 mm; however, the implant 300 may also include various extended lengths during various phases of resorption. In particular, displacement distances during extension post-resorption may also vary depending on materials, initial resting length, percent of resorption, and ratios of the second fiber population 322 to the first fiber population 324. For example, implant 300 may include an initial resting length of 180 mm, and a tensile force of 100N may be applied to the initial resting length resulting in the implant 300 without any measurable longitudinal extension. However, as the resorbable fibers resorb, the implant 300 may be able to extend farther than the initial resting length of 180 mm. For example, the implant 300 may be able to extend an additional 0.5-22 mm (e.g., an increase of 0-12% displacement) depending on the ratios of the second fiber population 322 to the first fiber population 324, and/or the percent of resorption.

Further, the extent of displacement may vary depending on the initial resting length from the first end 302 to the second end 304 of the implant 300. For example, if the implant 300 had an initial resting length that was shorter than 180 mm then the implant 300 may extend less, from the first end 302 to the second end 304, due to tension than when implant 300 is 180 mm. Similarly, if implant 300 had a greater initial resting length than 180 mm then implant 300 may extend farther, from the first end 302 to the second end 304, than if the implant 300 were 180 mm. In another example, implant 300 may initially include approximately 50% non-resorbable fibers and 50% resorbable fibers, which may provide greater displacement post-resorption than if implant 300 were to initially include 80% non-resorbable fibers to 20% resorbable fibers. Different materials may also influence the percent of displacement pre-resorption compared to post-resorption. For example, the second fiber population 322 of the network of interwoven fibers 320 may include a plurality of resorbable fibers, each resorbable fiber having a different resorption rate. In other embodiments, for example, the respective resorption rate of each resorbable fiber is the same.

The respective resorption rate of each resorbable fiber of the plurality of resorbable fibers of the second fiber population 322 may also correspond to an expected physiological healing rate of at least one tissue and/or bone of the patient. For example, it may be desirous to have little, if any, movement of the soft tissue for an initial period of a few hours to a period of a few months, depending on what soft tissue is being repaired and the extent of the damage/injury. During this initial period, it may be desirous to not have any resorption of the second fiber population 322. The desired duration of this initial period may, for example, be used to determine which materials to use for the second fiber population 322, which may provide a desired resorption rate based on inherent material characteristics of that particular material and how fast it degrades, resorbs, and/or erodes. The desired duration of this initial period may also be used to determine, for example, how much of the second fiber population 322 to include in the implant 300, since larger percentages of the second fiber population 322 may provide larger or more gaps and/or spaces post-resorption that allow for the implant 300 to extend farther than if the implant were to have a smaller percentage of the second fiber population 322 and thus smaller or fewer gaps and/or spaces post-resorption. After this initial time period, at least one fiber of the second fiber population 322 may resorb, which allows relatively limited movement of the healing soft tissue. Additional resorption rates of various other resorbable fibers may gradually allow for more movement of the damaged soft tissue, where resorption of each fiber occurs over a period of time where additional movement of the healing soft tissue is desired.

The second fiber population 322 may also include a plurality of resorbable fibers capable of being joined to form the second fiber population 322. The plurality of resorbable fibers may include a first set of resorbable fibers and a second set of resorbable fibers, where the first set of resorbable fibers may include a different resorption rate than the second set of resorbable fibers. For example, the first set of resorbable fibers may have a faster resorption rate than the second set of resorbable fibers. Further, the second fiber population 322 may include a plurality of resorbable fibers where each resorbable fiber of the plurality of resorbable fibers may be capable of being joined to include joined fibers, where the joined fibers may include at least one of: twisted fibers, plaited fibers, braided fibers, woven fibers, wrapped fibers, bonded fibers, heat pressed fibers, and/or combinations thereof. The plurality of resorbable fibers may also be joined as a strand of resorbable fibers, and the implant 300 may include multiple strands of resorbable fibers.

Figure 10:
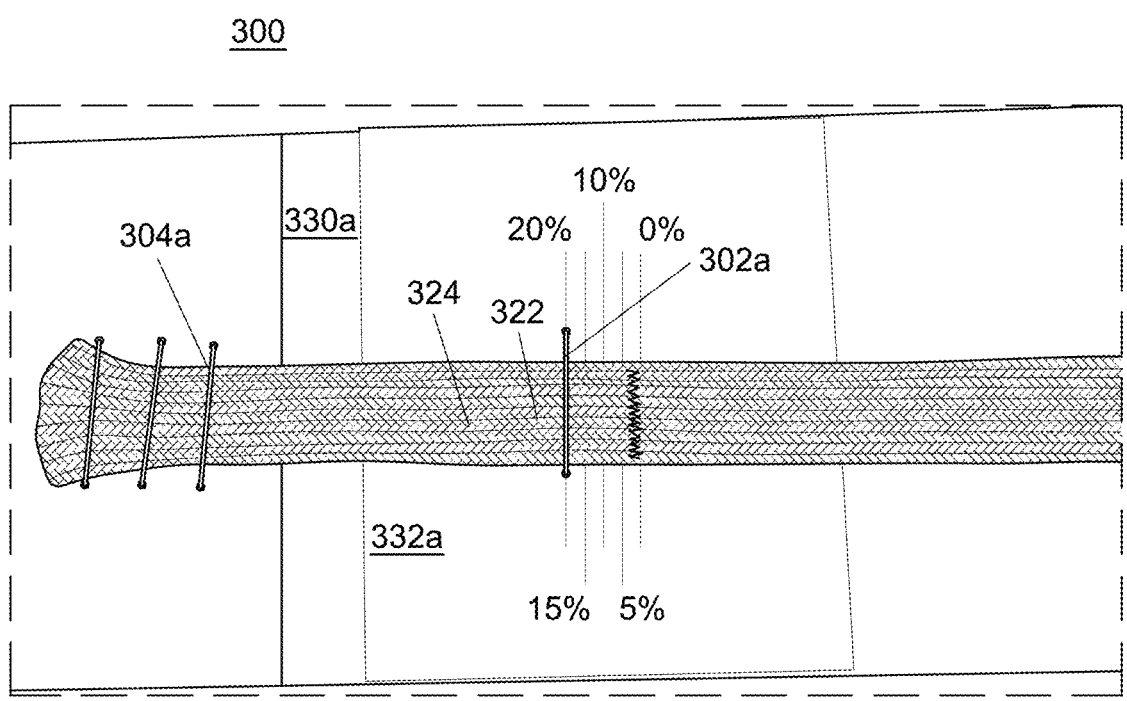
FIG. 10 is a front view of the implant of FIG. 3 being fully extended prior to resorption, in accordance with the present disclosure.
Figure 11:
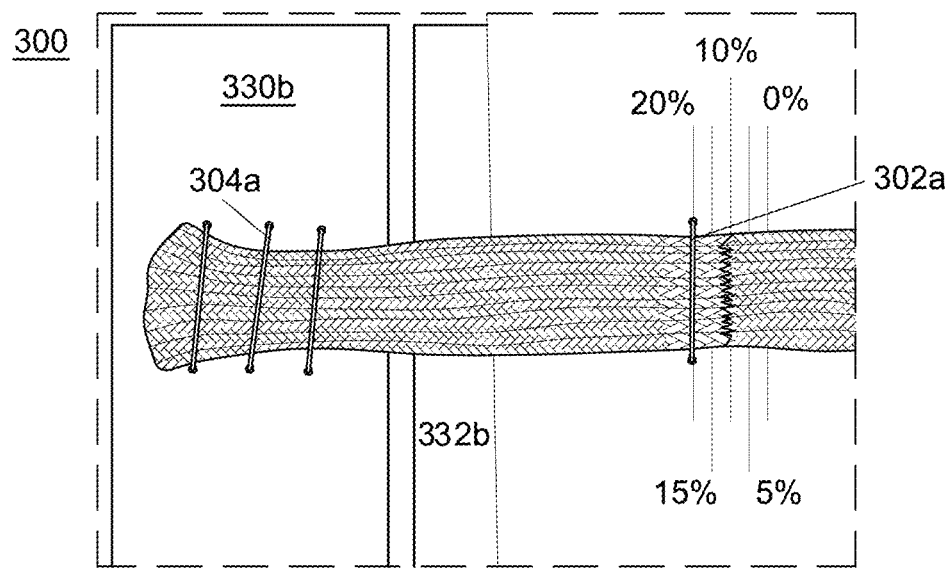
FIG. 11 is a front view of the implant of FIG. 3 being fully extended after approximately 10% resorption, in accordance with the present disclosure.
Figure 12:
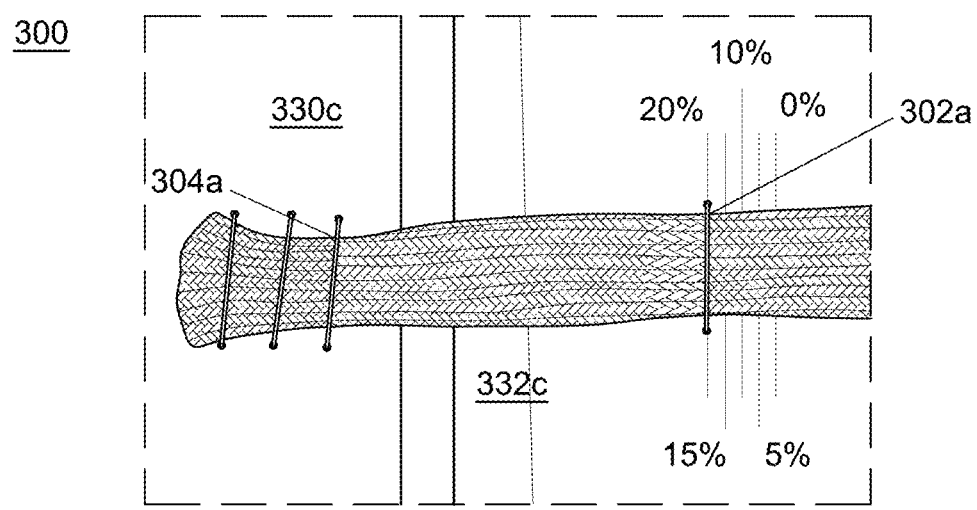
FIG. 12 is a front view of the implant of FIG. 3 being fully extended after approximately 20% resorption, in accordance with the present disclosure.

Referring now to FIGS. 10-12, the implant 300 may also include, according to various embodiments, multiple compositions 330a, 330b, 330c. For example, referring to FIG. 10, at time $T_0$ the implant 300 may include a first composition 330a that includes a plurality of resorbable fibers of the second fiber population 322 in addition to the first fiber population 324. The implant 300 may include an original extendable length 332a (e.g., $L_0$) from a first end 302a to a second end 304a. The first composition 330a may provide an original modulus of elasticity that is relatively inert such that the original extendable length 332a may be the same as a resting length of the implant 300.

At time $T_1$, referring to FIG. 11, the implant 300 may have experienced at least partial resorption of at least one resorbable fiber of the plurality of resorbable fibers of the second fiber population 322, which may provide a second composition 330b. For example, at time $T_1$, where $T_0<T_1$, the implant 300 may have experienced approximately 10% resorption of the plurality of resorbable fibers of the second fiber population 322. According to one embodiment, the second composition 330b may exclude, for example, at least one resorbable fiber of the plurality of resorbable fibers of the second fiber population 322 previously included at time $T_0$, which may be due to the at least one resorbable fiber having a resorption rate that is less than time $T_1$. This resorption rate enables the implant 300 to extend to a first extendable length 332b (e.g., $L_1$), from the first end 302 to the second end 304a that is longer than the original extendable length 332a (e.g., $L_0<L_1$). The first extendable length 332b may correspond to a desired physiological range of motion of at least one joint of the patient.

Further, referring to FIG. 12, implant 300 may experience, for example at time $T_2$, where $T_0<T_1<T_2$, additional resorption of at least one resorbable fiber of the plurality of resorbable fibers of the second fiber population 322, which may provide a third composition 330c. For example, at time $T_2$, the implant 300 may have experienced approximately 20% resorption of the plurality of resorbable fibers of the second fiber population 322. According to one embodiment, the third composition 330c may exclude, for example, at least one more resorbable fiber of the plurality of resorbable fibers of the second fiber population 322 than previously included at time $T_1$, which may be due to the at least one more resorbable fiber having a resorption rate that is greater than time $T_1$ but less than time $T_2$. Further, at time T2, the implant 300 may include a second extendable length 332c (e.g., $L_2$) that is longer (e.g., $L_0<L_1<L_2$), from the first end 302a to the second end 304a, than both the original extendable length 332a (e.g., $L_0$) and the first extendable length 332b (e.g., $L_1$). The second extendable length 332c may correspond to another desired physiological range of motion of the at least one joint of the patient.

Depending on the number of resorbable fibers, the ratio of the second fiber population 322 to the first fiber population 324, and the resorption rates for each of the resorbable fibers of the second fiber population 322, as time goes on, e.g., $T_n$ where $T_0<T_1<T_2<T_n$, the second fiber population 322 may, for example, continue to resorb and the extendable length of the implant 300 may gradually increase (e.g., $L_0<L_1<L_2<L_n$). This additional resorption may provide, for example, a plurality of compositions, where each composition has a greater extendable length than the previous composition. Resorption of the plurality of resorbable fibers of the second fiber population 322 may, for example, continue until each of the resorbable fibers of the second fiber population 322 has resorbed.

Figure 13A:
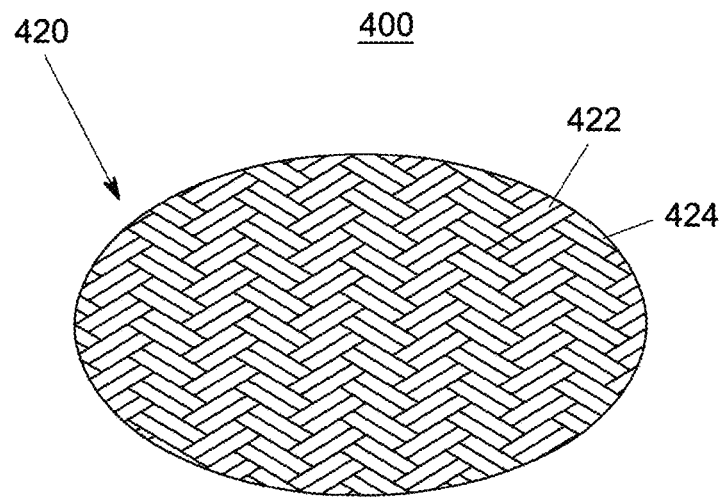
FIG. 13A is a magnified front view of an exemplary implant prior to resorption, in accordance with the present disclosure.

FIG. 13A shows a front view of an exemplary implant 400 prior to resorption, in accordance with the present disclosure. The implant 400 includes a network of interwoven fibers 420 that includes a first fiber population 424. The first fiber population 424 includes at least one non-resorbable fiber and an arrangement of non-resorbable fibers that includes a plurality of gaps (see FIG. 13B) between portions of the at least one non-resorbable fiber. Further, the network of interwoven fibers 420 of the implant 400 includes the second fiber population 422. The second fiber population 422 includes at least one resorbable fiber as well as an arrangement of resorbable fibers that includes a positioning of the at least one resorbable fiber, where the positioning traverses the plurality of gaps (see FIG. 13B). The network of interwoven fibers 420 may include a total fiber population with an initial range of about 1% to about 50% of the second fiber population 422. The total fiber population of the interwoven fibers 420 may also include a post-resorption range of the second fiber population 422 that may be less than the initial range. For example, the total fiber population may initially include 50% resorbable fibers of the second fiber population 422 and 50% non-resorbable fibers of the first fiber population 424; however, as the resorbable fibers of the second fiber population 422 resorb, the total fiber population of the second fiber population 422 may decrease.

Figure 13B:
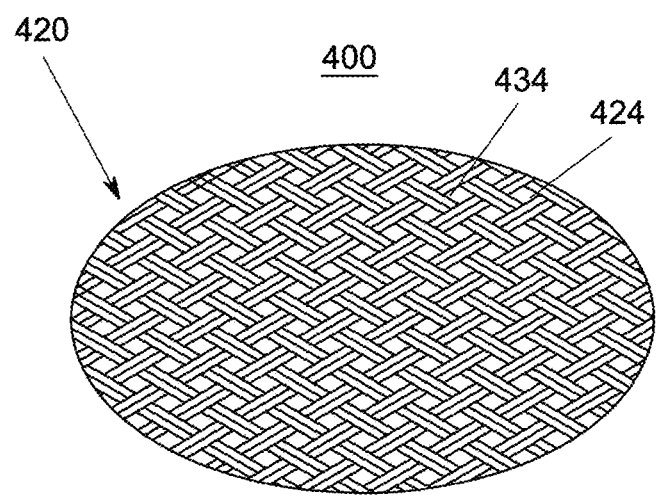
FIG. 13B is a magnified front view of the implant of FIG. 13A post-resorption, in accordance with the present disclosure.

For example, FIG. 13B shows the second fiber population 422 of FIG. 13A having been resorbed such that the total fiber population of the resorbable fibers of the second fiber population 422 (see FIG. 13A) being substantially less than the initial fiber population. In other embodiments, depending on how much resorption is desired, the implant 400 may initially include a total fiber population of 10% resorbable fibers of the second fiber population 422 (see FIG. 13A) and 90% non-resorbable fibers of the first fiber population 424, and the post-resorption range may be 0% of the second fiber population 422 (see FIG. 13A) and 100% of the first fiber population 424. Once the second fiber population 422 (see FIG. 13A) resorbs, for example, the implant 400 may be left with gaps 434 previously occupied by the resorbable fibers of the second fiber population 422 (see FIG. 13A). An implant 400 that initially had higher percentages of the first fiber population 424 may, for example, have fewer and/or smaller gaps 434 than an implant 400 that initially had lower percentages of the first fiber population 424. Various other total compositions, fiber populations, and ratios of resorbable to non-resorbable fibers are also contemplated herein.

Figure 14:
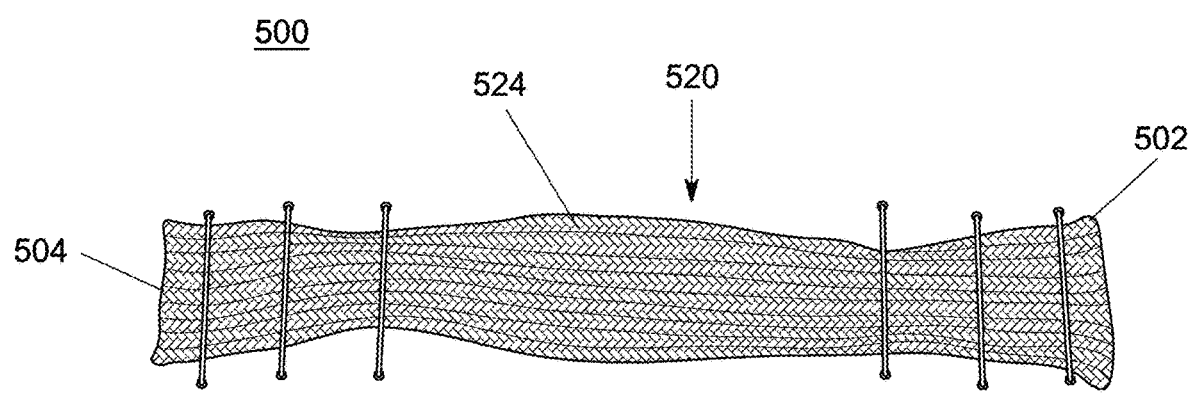
FIG. 14 is a front view of an exemplary implant post-resorption, in accordance with the present disclosure.

FIG. 14 is a front view of an exemplary implant 500 post-resorption. The implant 500 may include, for example, a network of interwoven fibers 500 that includes an extendable weave angle that is capable of extending farther, from the first end 502 to the second end 504, than prior to resorption of at least some resorbable fibers. For example, post-resorption the implant 500 may be capable of extending to a length that corresponds to a physiological range of motion of at least one joint. The implant 500 may also include a first fiber population 524 that has, for example, rearranged from where the non-resorbable fibers were positioned prior to resorption.

Referring now to FIGS. 15A and 15B, the implant 600 may include a first composition 640 that includes a relatively non-extendable weave angle 642, of approximately 30 degrees, and the second composition 644 may include an extendable weave angle 646, where the extendable weave angle 646 may be greater than or equal to the relatively non-extendable weave angle 642. The first composition 640 may include relatively no major changes in mechanical properties until resorption has reached such a point where the resorbable material starts to crack and/or degrade 648. It is understood that in various embodiments, the first composition may be maintained without any resorption of resorbable fibers to allow for scar tissue to form over a time period of approximately a few hours to several months depending on the severity of the injury and/or the particular tissues and/or bones that may be damaged. As the implant transitions from the first composition 640 to the second composition 644, relatively large changes in mechanical properties of the implant 600 may occur due to resorption of resorbable fibers. The transition from the first composition 640 to the second composition 644 may correspond with a duration of time required for the damaged soft tissue to gradually adapt and remodel to replace the initial scar tissue with more structurally rigid fibers that may be needed to regain appropriate biomechanical functionality. The implant 600 may, for example, lessen the load applied to the damaged soft tissue during the first composition, but as the resorbable fibers resorb, the load on the damaged soft tissue may gradually be increased.

Figure 16A:
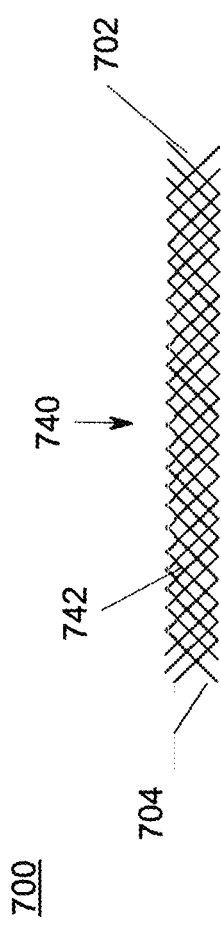
FIG. 16A is a front view illustrating an exemplary implant with an approximate 45-degree weave angle prior to resorption.
Figure 16B:
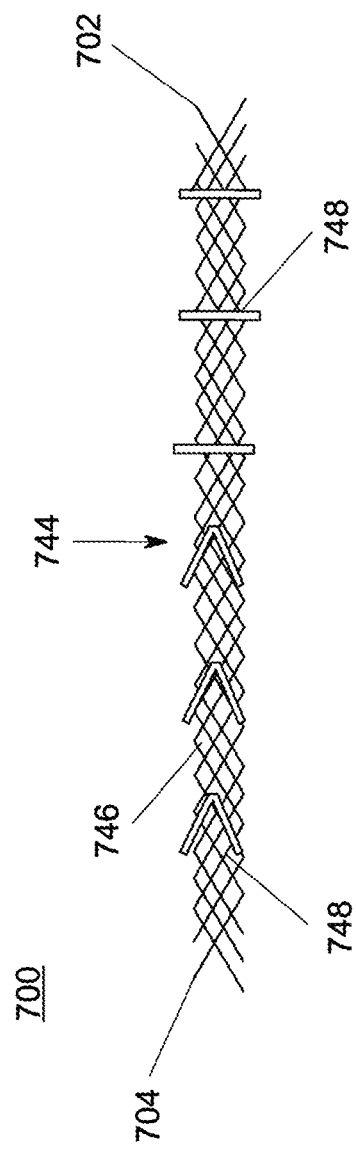
FIG. 16B is a front view illustrating the implant of FIG. 16A post-resorption, in accordance with the present disclosure.

Various other compositions are possible. For example, as shown in FIGS. 16A and 16B, an implant 700 may also have a first composition 740 that includes a relatively non-extendable weave angle 742 that may be approximately 45 degrees, and a second composition 744 that produces the same extendable weave angle 746 as the extendable weave angle 646 of FIG. 15B of the implant 600 where the initial non-extendable weave angle 642 was approximately 30 degrees.

In one example embodiment, at time zero, a synthetic implant 700 (i.e., resorbable/non-resorbable fibers) has a stiffness of $K_{syn}$, and a natural soft tissue (e.g., ligament) has a stiffness of $K_{nat}$. Thus, the total parallel stiffness of the physiological system, $K_{TOTAL}$, may equal the sum of $K_{nat}$ and $K_{syn}$ (i.e., $K_{TOTAL}=K_{nat}+K_{syn}$). At the time of the injury and/or damage to the soft tissue, the damaged soft tissue may have a stiffness of essentially zero, where $K_{nat}=0$, and an inserted implant 700 may provide all of the stiffness, $K_{syn}=1$, where 1=an assumed imaginary number. Thus, at the time of the injury and when the implant 700 is inserted, $K_{TOTAL}=0+1=1$. As the soft tissue begins to heal, individual fibers of the implant 700 begin to resorb and lessen stiffness of the implant 700, which enables the damaged soft tissue to share the load of any forces applied to the damaged soft tissue with the implant 700. For example, the implant 700 may lessen its stiffness by 50%, which would provide, for example, approximately 50% more load bearing forces to the soft tissue. This would be reflected by $K_{nat}=0.5$ and $K_{syn}=0.5$, where $K_{TOTAL}=0.5+0.5=1$. Additionally, according to one embodiment, the shared load could provide different proportions or stiffness greater or less than the natural physiological system. For example, in a physiological system, the shared parallel stiffness could be $K_{nat}=0.25$ and $K_{syn}=0.75$, which would equal the full amount of stiffness typically exerted on a physiological system due to tension and/or a force/load $K_{TOTAL}=0.25+0.75=1$. However, the stiffness could be greater than the stiffness typically exerted on the physiological system when $K_{nat}=0.25$ and $K_{syn}=1$, so $K_{TOTAL}=0.25+1=1.25$. Such increased stiffness that may be greater than the stiffness typically exerted by a physiological system may be advantageous when, for instance, it is desired for the system to protect against another local injury and/or to provide additional support for degenerative structures).

The implant 700 may include at least one biocompatible material. Further, the at least one biocompatible material may include a plurality of biocompatible materials, where a non-resorbable fiber includes a first biocompatible material and a first resorbable fiber includes a second biocompatible material that may be different from the first biocompatible material. Additionally, the implant 700 may include a plurality of resorbable fibers, where the first resorbable fiber includes the second biocompatible material and a second resorbable fiber includes a third biocompatible material that may be different from the first biocompatible material and different from the second biocompatible material. For example, the second biocompatible material may include at least one synthetic polymer and the third biocompatible material may include at least one other synthetic polymer.

In one example, implant 700 may include at least one resorbable fiber that includes a plurality of resorbable fibers. The plurality of resorbable fibers may include a plurality of biocompatible materials, where a first set of resorbable fibers may include a first biocompatible material, and a second set of resorbable fibers may include a second biocompatible material. Further, the first biocompatible material may be capable of providing a faster resorption rate for the first set of resorbable fibers when compared to what the second biocompatible material is capable of providing for the second set of resorbable fibers.

In another example, implant 700 may include plurality of resorbable fibers, where the plurality of resorbable fibers may include a first set of resorbable fibers that include a first biocompatible material that has a first resorption rate. The plurality of resorbable fibers may also include a second set of resorbable fibers that include a second biocompatible material that has a second resorption rate, where the first biocompatible material includes a higher rigidity than the second biocompatible material. Further, the first resorption rate may be faster than the second resorption rate and, based on the first set of resorbable fibers resorbing, the second biocompatible material of the second set of resorbable fibers may be capable of providing elasticity to the implant 700 that was not possible prior to resorption of the first set of resorbable fibers.

Biocompatible materials may, for example, include a biological polymer, a synthetic polymer, or combinations thereof. Some examples of resorbable polymers that may be used as biocompatible material for the at least one resorbable fiber may include, but are not limited to, natural fibers (e.g., cat-gut type fibers), polyesters prepared synthetically or biologically; polymers including glycolic acid, lactic acid, 1,4-dioxanone, trimethylene carbonate, 3-hydroxybutyric acid, ε-caprolactone, including polyglycolic acid, polylactic acid, polydioxanone, polycaprolactone, copolymers of glycolic acid and lactic acids, such as polymer VICRYL®, MAXON® and MONOCRYL® polymers, and including poly (lactide-co-caprolactones); poly (orthoesters); polyanhydrides; poly (phosphazenes); polyhydroxyalkanoates; polycarbonates; tyrosine polycarbonates; polyamides (including synthetic and natural polyamides, polypeptides and poly (amino acids)); polyesteramides; poly (alkylene alkylates); polyethers (such as polyethylene glycol, PEG and polyethylene oxide, PEO); polyvinyl pyrrolidones or PVP; polyurethanes; polyether esters; polyacetals; polycyanoacrylates; poly (oxyethylene)/poly (oxypropylene) copolymers; polyacetals; polyphosphates; polymers (containing phosphorus); polyphosphoesters; polyalkylene oxalates; polyalkylene succinates; poly (maleic acids); silk (including recombinant silk and silk derivatives and the like); chitosan; modified chitosan; biocompatible polysaccharides; hydrophilic or water-soluble polymers, such as polyethylene glycol (PEG) or polyvinylpyrrolidone (PVP), with blocks of other biocompatible or biodegradable polymers, for example, poly (lactide), poly (lactide-co-glycolide), or polycaprolactone or combinations of mixtures of other polymers may also be used as part of the at least one resorbable fiber.

Some examples of non-resorbable polymers that may be used as part of the at least one non-resorbable fiber may include, but are not limited to, natural fibers (e.g., cat-gut type fibers), polymers and copolymers of ethylene and propylene, including ultra high molecular weight polyethylene, ultra high molecular weight polypropylene, nylon, polyesters such as poly (ethylene terephthalate), poly (tetrafluoroethylene), polyurethanes, poly (ether-urethanes), poly (methylmethacrylate), polyether ether ketone, polyolefins and poly (ethylene oxide).

The biocompatible materials may, for example, be coated and/or modified to improve tissue healing (e.g., with cell adhesion polypeptides capable of binding cells). The biocompatible materials may also, for example, include bioactive agents designed to stimulate tissue repair and/or cell growth, including growth factors, cell differentiation factors, cell recruitment factors, cellular receptors, cell binding factors, cell signaling molecules, such as cytokines, and molecules to promote cell growth, cell migration, cell division, cell proliferation and extracellular matrix deposition. Other bioactive agents may include antimicrobial agents such as antibiotics, disinfectants, oncological agents, anti-scarring agents, anti-inflammatory agents, anesthetics, small molecule drugs, anti-angiogenic factors and pro-angiogenic factors, immunomodulatory agents and coagulation agents. The biocompatible materials may also, for example, be coated and/or modified to provide mechanical advantages. For instance, the biocompatible materials may be modified to provide a more slippery environment and/or surface, which may cause adhesion, localized gripping, and/or tissue attachment using, for example, hydroxyapatite (HA) coatings.

Figure 17A:
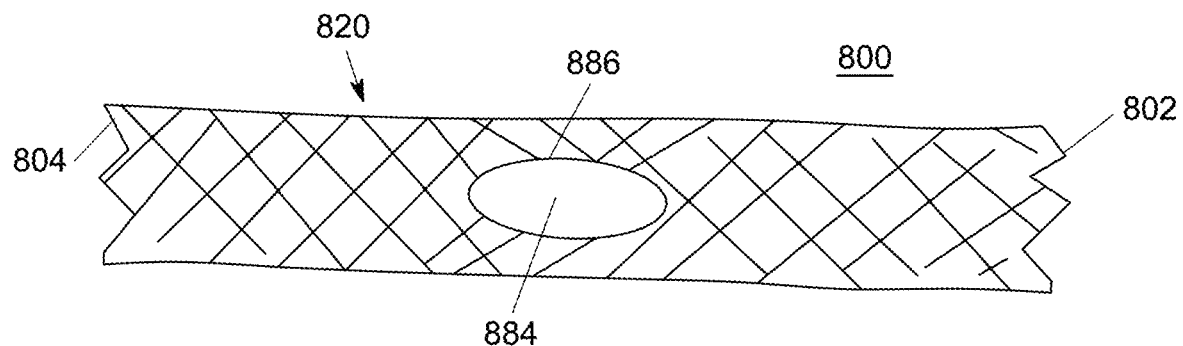
FIG. 17A is a front view illustrating an exemplary implant that includes an aperture, in accordance with an aspect of the present invention.
Figure 17B:
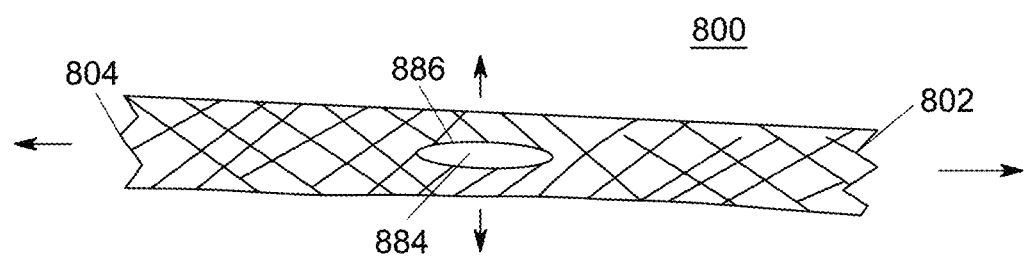
FIG. 17B is a front view illustrating the implant of FIG. 17A when tension is applied, in accordance with an aspect of the present invention.

Referring now to FIGS. 17A and 17B, according to one embodiment, the implant 800 may include at least one aperture 884 in the network of interwoven fibers 820. Each aperture 884 may include a rigid fiber material 886 (e.g., a shape-memory alloy) incorporated around an inner circumferential edge of the aperture 884. Shape-memory alloys may include any metal alloys capable of returning to a predeformed shape when heated (e.g., heat set nitinol). When tension is applied to the implant 800, as shown in FIG. 17B, the natural shape of rigid fiber material 886 may become deformed and, due to the rigidity of the rigid fiber material 886, the rigid fiber material 886 may be capable of providing an elastic action (e.g., a spring-back action) to return to its natural shape. According to one implant embodiment, the implant 800 may include a plurality of apertures 884, where each aperture 884 includes rigid fiber material 886 around a respective inner circumferential edge of the aperture 884. The apertures 884 may be spaced apart along the length of the implant 800 such as, for example, every 5 mm. Due to there being a plurality of rigid fiber materials 886, the rigid fiber material 886 of each aperture 884 is capable of accumulating each elastic action to provide an accumulated spring-back action that provides greater elastic force to the implant 800 than the elastic action of rigid fiber material 886 of a single aperture 884.

Figure 18:
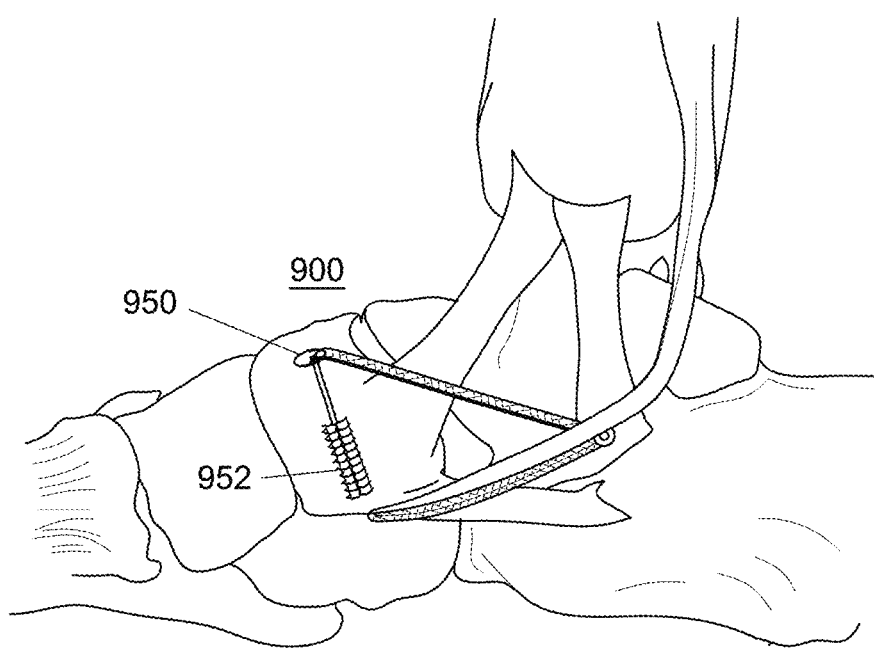
FIG. 18 is a lateral view illustrating an exemplary implant implanted within a patient using an anchoring system, in accordance with an aspect of the present invention.

FIG. 18 illustrates an exemplary implant 900 implanted within a patient using an anchoring system that permits fixation of the implant 900 to bone. The anchoring system may include, for example, an anchor 952 inserted into a hole 950 in the patient's bone, where the anchor 952 is fixated to the bone using a threaded outer surface. A portion of the implant 900 may pass through an eyelet of the anchor 952 and the implant 900 may also attach to soft tissue (e.g., a tendon). The anchor 952 may include, for example, a bioabsorbable material or a non-absorbable, permanent material. Absorbable anchor materials may include natural material (e.g., cat-gut type material), polyglycolic acid, polylactic acid or trimethylene carbonate copolymers, and/or combinations thereof, etc. Non-absorbable anchor materials may include acetal homopolymers or copolymers, polyethylene, polypropylene, polyester and copolymers thereof, and/or various biocompatible metals, etc.

Figure 19:
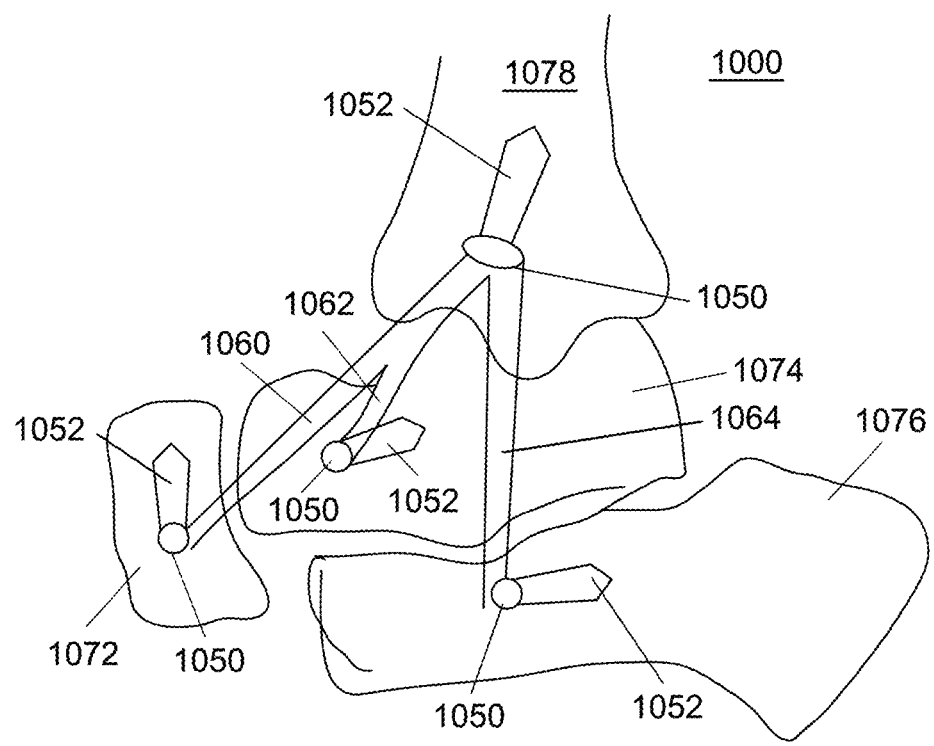
FIG. 19 is a lateral view illustrating an exemplary implant implanted within a patient using another anchoring system, in accordance with aspects of the present invention.

Referring to FIGS. 19-21B, an implant 1000 may also include at least one branch 1060, 1062, 1064. The at least one branch may, for example, include a separation of the implant's 1000 total fiber population. Further, the at least one branch may include a first segment 1060 that includes a portion of the first fiber population (not shown) and a portion of the second fiber population (not shown). Additionally, the at least one branch may include, for example, a second segment 1062 that includes another portion of the first fiber population (not shown) and another portion of the second fiber population (not shown). The implant 1000 may also include, for example a third segment 1064 and/or additional segments depending on various embodiments. The implant 1000 may also include, for example, at least one furcation capable of forming at least one of a bifurcation, a trifurcation and a quadfurcation. The at least one branch may, for example, facilitate fixating the implant 1000 to various different fixation points around the patient's joint (e.g., multiple bones). The implant 1000 may include a simple anchor with highly defined suture tape. The For example, as shown in FIG. 19, the implant 1000 may include a first segment 1060 connected to the patient's navicular bone 1072, a second segment 1062 connected to the talus 1074, and a third segment 1062 connected to the calcaneus 1076. Each segment 1060, 1062, 1064 may be fixated to the respective bones 1072, 1074, 1076 using anchors 1052 inserted into respective holes 1050. A middle portion of the implant 1000 may also be connected to the patient's tibia 1078. For example, the implant 1000 may pass through an eyelet of the anchor 1052. In particular, the implant 1000 may also include, as discussed above, a region 1080 that may be of a substantially solid composition with a rounded configuration to facilitate passing the implant 1000 through an eyelet of an anchor 1052. Alternatively, the region 1080 may be, for example, flat and smaller than the round configuration to facilitate passing the implant through the eyelet of an anchor 1052. Various other branching schemes are possible depending on the joint being treated. The at least one branch 1060, 1062, 1064 may be, for example, three or more segments or legs that exit the anchor. The anchor 1052 may include, for example, a Peek screw in or lock down top 1082, a dynamic loading body 1086, and a titanium punch in tip 1088.

Figure 20:
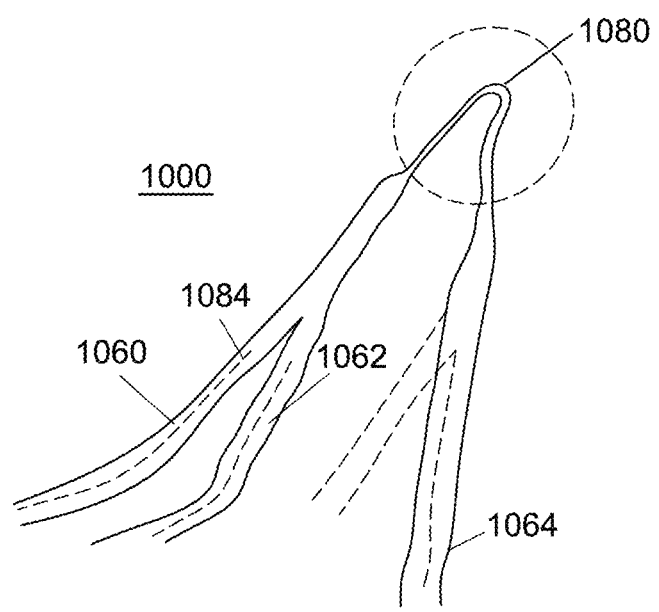
FIG. 20 is a front view illustrating an exemplary implant, in accordance with aspects of the present invention.
Figure 21A:
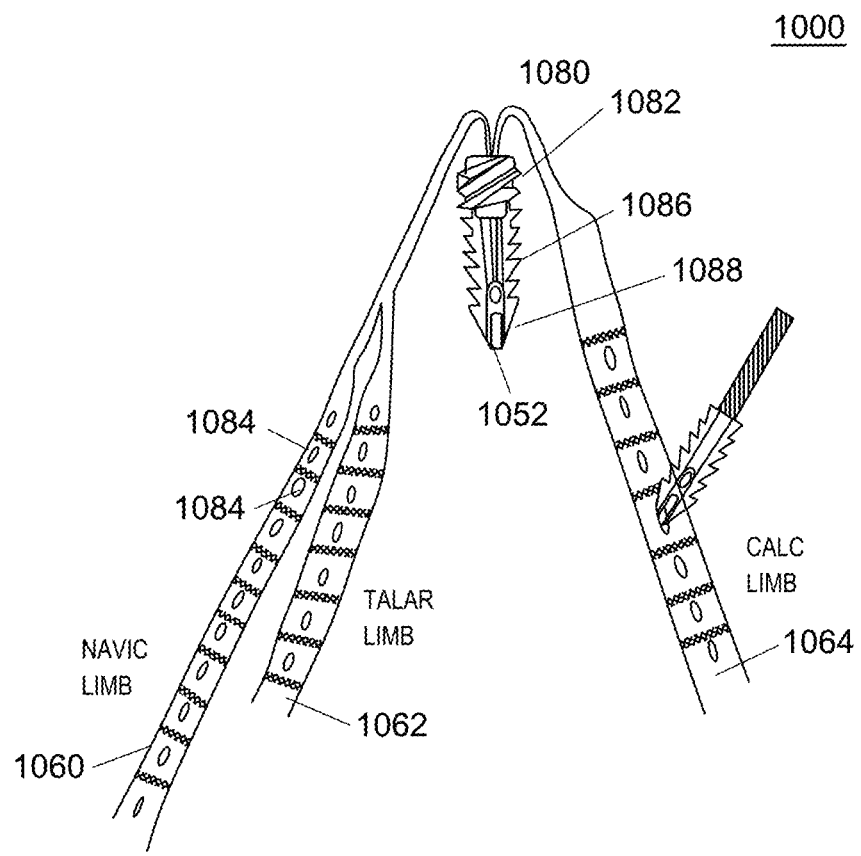
FIG. 21A is a front view illustrating an exemplary implant connected to an anchor, in accordance with an aspect of the present invention.
Figure 21B:
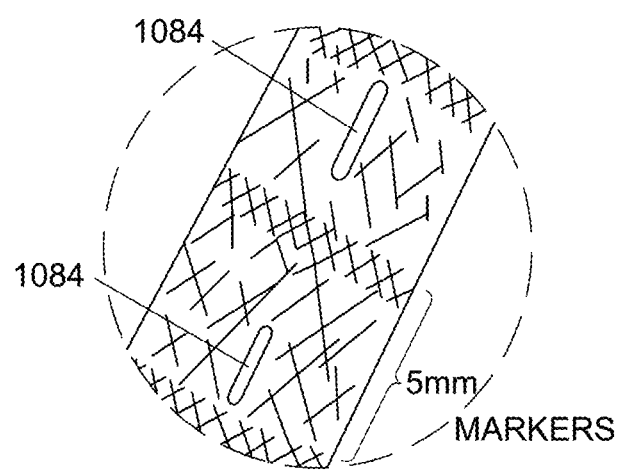
FIG. 21B is a front view illustrating a portion of the implant of FIG. 21A, in accordance with an aspect of the present invention.

With particular reference to FIGS. 20-21B, the implant 1000 may also include at least one aperture 1084. The apertures 1084 may be incorporated into the various segments 1060, 1062, 1064 during production and/or punctured into the various segments 1060, 1062, 1064 during insertion of the implant 1000 into the patient. The apertures 1084 may extend, for instance, from one planar surface of the implant 1000 to an opposing planar surface of the implant 1000. As discussed above, one aperture 1084 may be spaced apart from another aperture 1084 along the length of the implant 1000 such as, for example, every 5 mm. Additionally, the apertures 1084 may be capable of receiving at least a portion of an anchor 1052 for fixating the implant 1000 in a particular position. The at least one aperture 1084 may be, for example, eyelets for custom anchors and positioning.

Figure 22:
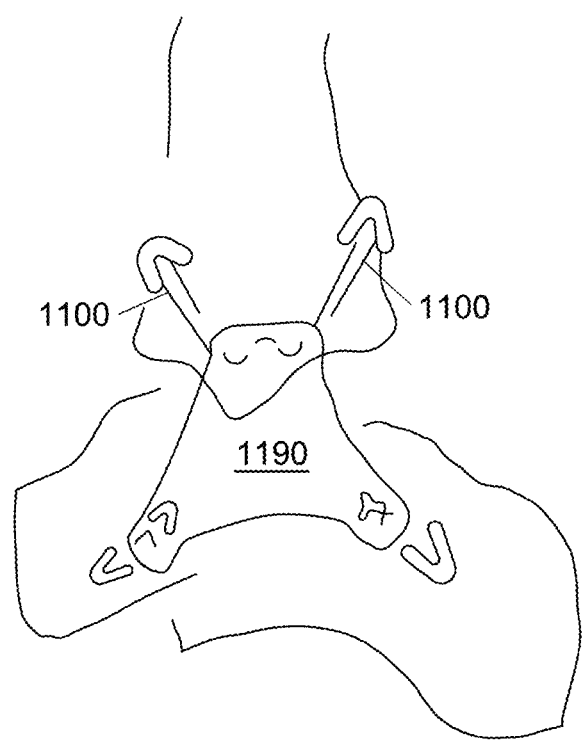
FIG. 22 is a front view illustrating an exemplary implant in combination with another implantable material, in accordance with an aspect of the present invention.

FIG. 22 illustrates a plurality of implants 1100 attached to another implantable material 1190. The other implantable material 1190 may include, for instance, an allograft material, bone and/or soft tissue segments (e.g., other tendons, ligaments etc.), and/or various other grafts, soft tissue anchors, interference screws, and/or suture holes in bone plates. Various combinations of implants 1100, in accordance with aspects described herein, may be combined with other implantable devices, materials, constructs, etc., which are also contemplated herein.

Figure 23:
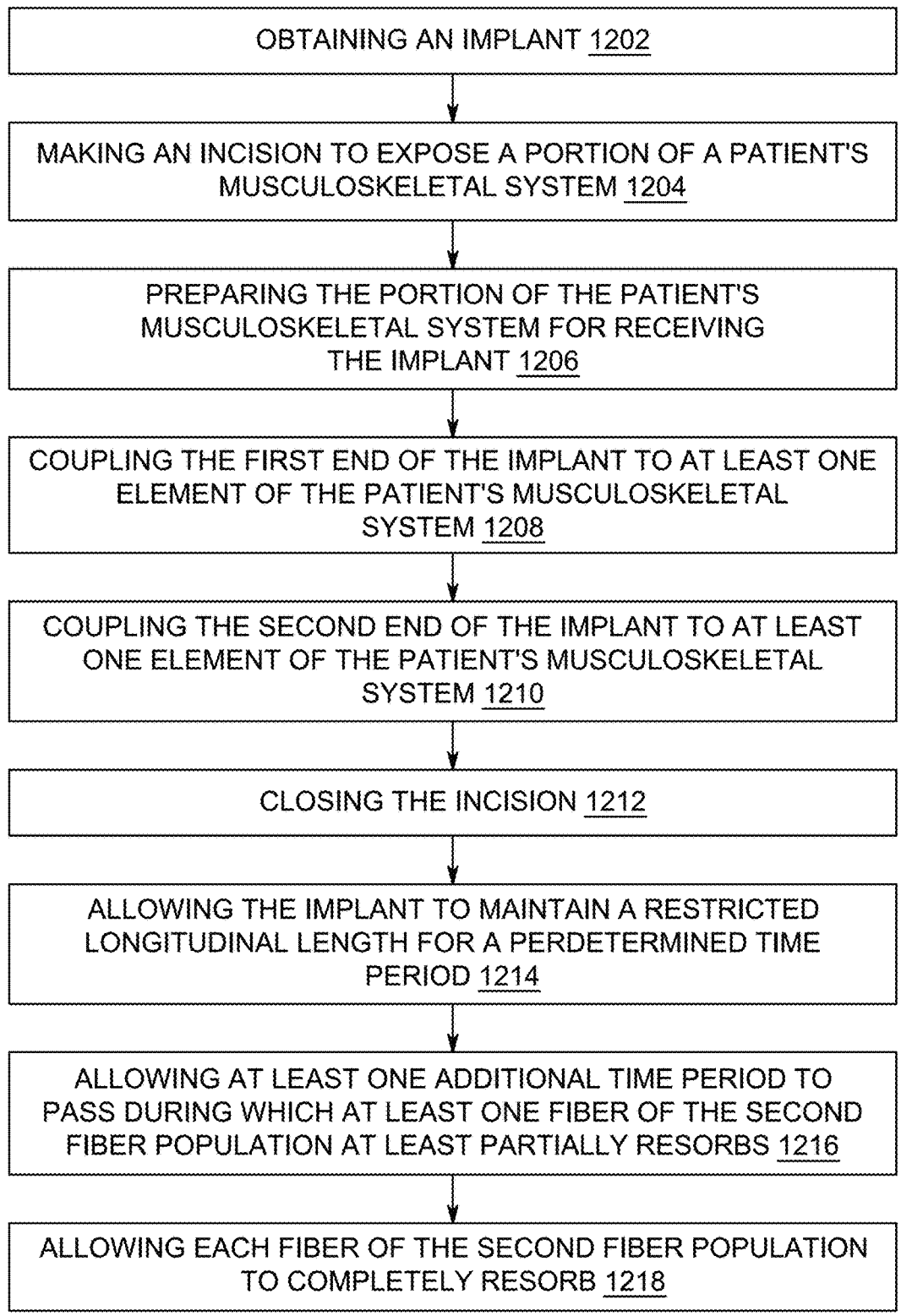
FIG. 23 illustrates an exemplary surgical method, in accordance with the present disclosure.

Referring now to FIG. 23, disclosed herein is a surgical method 1200. The surgical method 1200 may include obtaining or retrieving an implant 1202 and making an incision to expose a portion of a patient's musculoskeletal system 1204. The method 1200 may further include preparing the portion of the patient's musculoskeletal system for receiving the implant 1206 and coupling a first end of the implant to at least one element of the patient's musculoskeletal system 1208. Further, the method 1200 may include coupling a second end of the implant to at least one element of the patient's musculoskeletal system 1210 and closing the incision 1212. This coupling may fix, prevent, and/or otherwise restrain movement about an axis (e.g., angularly about the axis of a joint) of at least one joint of the patient.

Referring still to FIG. 23, the method 1200 may also include allowing the implant to maintain a restricted longitudinal length for a predetermined time period 1214. Further, the method 1200 may include allowing at least one additional time period to pass during which at least one fiber of the second fiber population at least partially resorbs 1216.

Further, allowing the at least one fiber of the second fiber population to at least partially resorb facilitates extending the implant from the restricted longitudinal length to an expanded longitudinal length. Additionally, the predetermined time period may correspond to an expected heal time of at least some soft tissue of the musculoskeletal system of the patient.

The surgical method 1200 may also include allowing each fiber of the second fiber population to completely resorb 1218. Additionally, the second fiber population may also include a first fiber that has a first resorption rate and a second fiber that has a second resorption rate. Allowing the at least one additional time period to pass may include allowing a first additional time period to pass to allow resorption of the first fiber, and allowing a second additional time period to pass to allow resorption of the second fiber.

Additionally, the implant itself may be suitable for performing a method for providing musculoskeletal support to a patient. This musculoskeletal support may be provided by resisting pressure applied to the implant via at least one joint of the patient. Resisting this pressure may include extending to a maximum length of at least one resorbable fiber of the implant. Further, the at least one resorbable fiber may resorb, which facilitates extending the implant beyond the maximum length of the at least one resorbable fiber. The implant may then extend to a maximum length of at non-resorbable fiber, where the maximum length of the non-resorbable fiber may be longer than the maximum length of the at least one resorbable fiber. Further, extending the implant to the maximum length of the at least one resorbable fiber is capable of limiting motion of the at least one joint of the patient.

Those skilled in the art will understand that the features, elements, and functions described herein may be combined, and that combinations are expressly contemplated herein.

Various modifications to the surgical method 1200 are contemplated herein. For example, the implant may be coupled to the patient's musculoskeletal system using a knot, tie, staple, drilling a bone hole and threading a portion of the implant through the bone hole, etc. Optionally, the implant may be coupled to the patient's musculoskeletal system using one or more tools, which may include, for instance, tools specifically designed for inserting the implant into the patient and optionally included as part of a kit. Further, the surgical method 1200 may include marking position for the implant to provide desired positioning. Compositions of the implant that include furcations (e.g., bifurcations, trifurcations, etc.) may include additional fixations points with respective coupling processes to connect various ends of the implant to multiple fixation points (e.g., bones) of the patient.

Additionally, the surgical method 1200 may include inserting an anchor into the patient's bone, where the anchor includes a threaded fixation point for fixating the anchor to the bone. The anchor may include an eyelet through which a portion of the implant may loop and/or become secured to in order to maintain positioning of the implant relative to the patient's joint. The anchor may include, for example, an allograft material or other biocompatible material.

Referring now to FIGS. 24-27, an exemplary implant 1300 is shown, with the implant 1300 having the same and/or similar applications, capability and features to implants shown and described previously herein (e.g., the implant 100, etc.). The implant 1300 is shown to include a central portion or body 1310 as well as a pair of end portions 1320 where the end portions 1320 are arranged on the implant adjacent the body 1310. The implant 1300 may have varying widths along the length thereof, for example to facilitate threading or manipulation of the implant 1300 prior to or during implantation. The implant 1300 is further shown to include a pair of transition portions 1330, where each of the transition portions 1330 is positioned between the body 1310 and the end portions 1320 of the implant. In some embodiments such as that shown in FIGS. 24-27, the transition portions 1330 may have a tapered geometry (e.g., decreases in width along the length of the transition portion 1330) with the portion of the transition portion 1330 that abuts the body 1310 having a greater width than the portion of the transition portion 1330 that abuts the end portion 1320. Further, in some embodiments the transition portions 1330 may have varying lengths and, accordingly, may include more gradual (e.g., longer) or more abrupt (e.g., shorter) tapers between the body 1310 and the end portions 1320.

Figure 24:
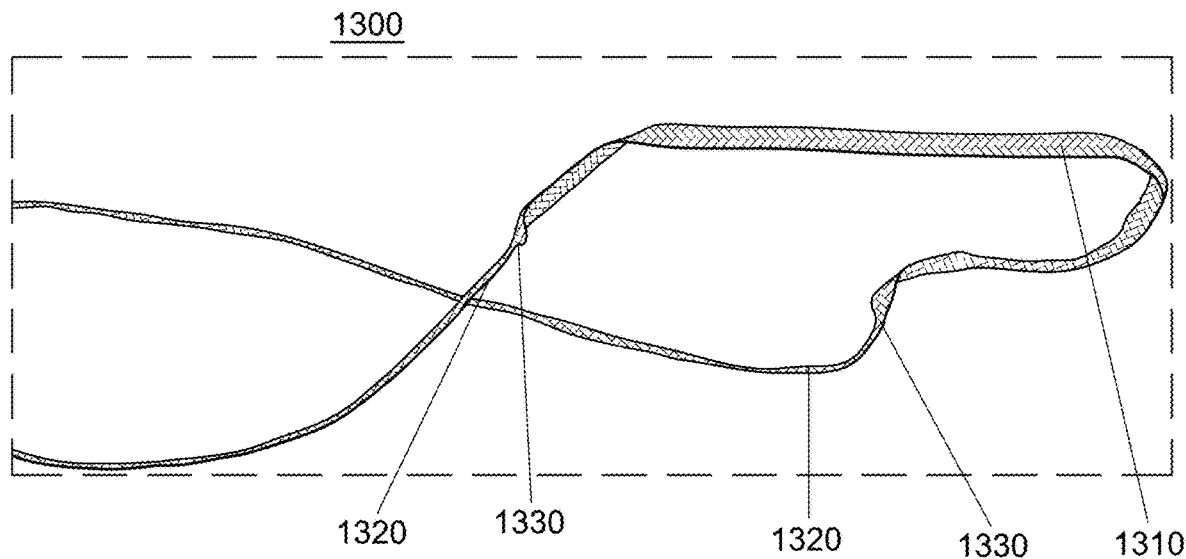
FIG. 24 is a perspective view of an exemplary implant, in accordance with the present disclosure.
Figure 25:
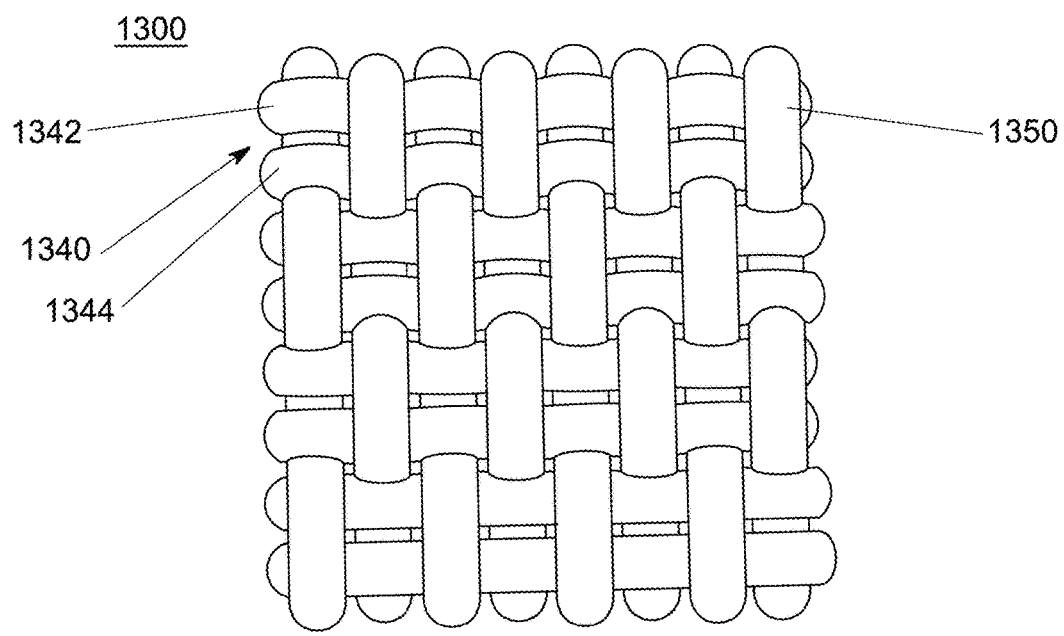
FIG. 25 is an illustration showing a schematic perspective view of an exemplary implant with an approximate 90-degree weave angle, in accordance with the present disclosure.
Figure 26:
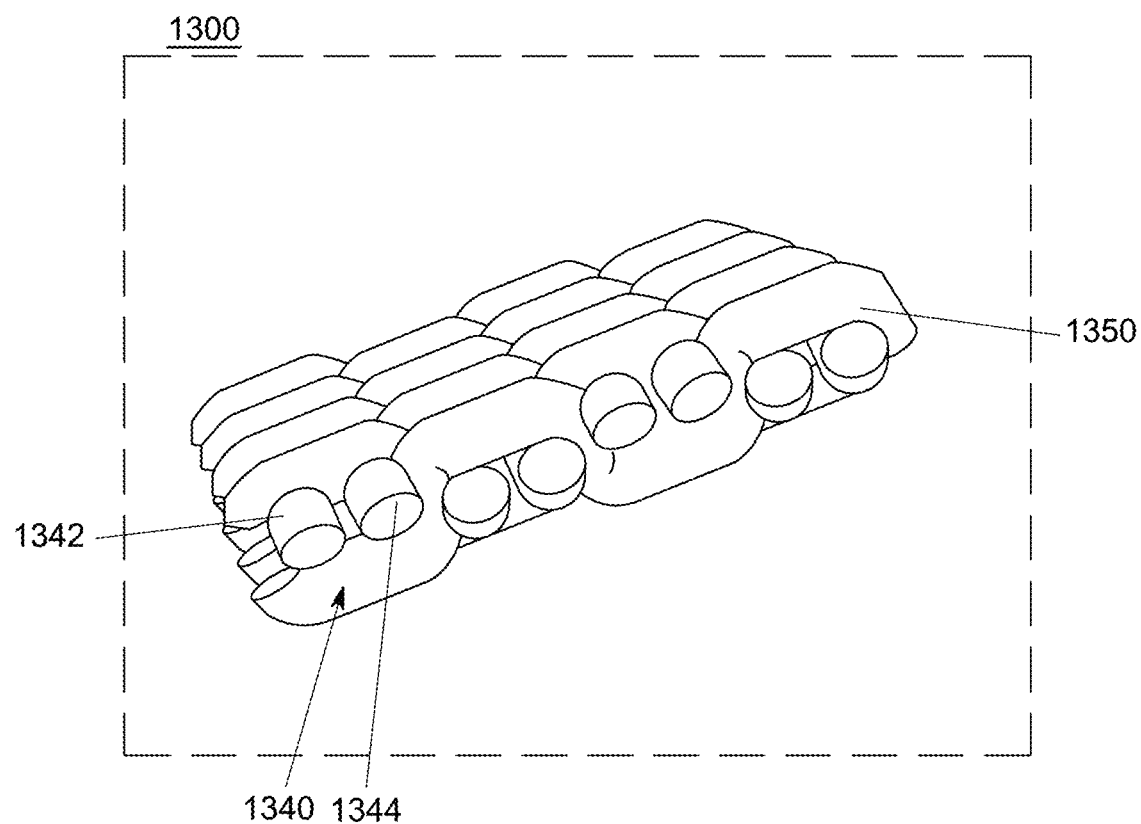
FIG. 26 is an illustration showing a schematic top view of the exemplary implant of FIG. 25a, in accordance with the present disclosure.
Figure 27:
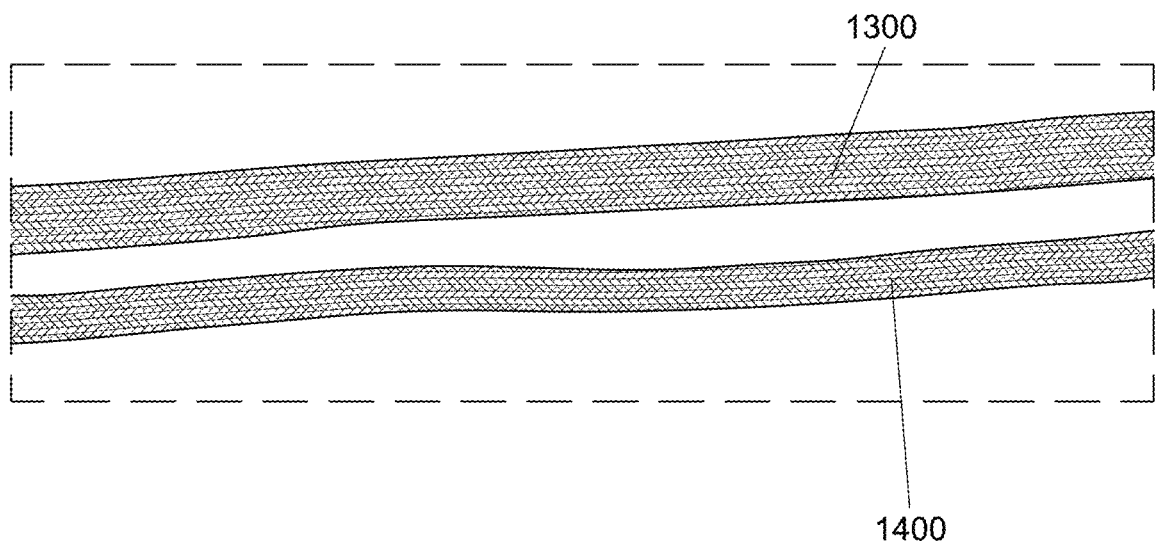
FIG. 27 is a top view of two exemplary implants, in accordance with the present disclosure.

FIGS. 26-26 show a close-up, schematic illustration of the implant 1300 as shown in FIGS. 24 and 27. The implant 1300 includes first fibers 1340 and second fibers 1350 arranged as shown in in FIGS. 25-26. The first fibers 1340 are shown to be arranged substantially perpendicular relative to the second fibers 1350, which is to say that the first fibers 1340 form an approximately 90-degree angle with the second fibers 1350. In some embodiments, the first fibers 1340 may extend longitudinally along a length of the implant 1300 while the second fibers 1350 extend laterally across the implant 1300, while in other embodiments the first fibers 1340 max extend laterally across the implant 1300 while the second fibers 1350 extend longitudinally along the length of the implant. Accordingly, in some embodiments the first fibers 1340 may have a greater length than the second fibers 1350, while in other embodiments the first fibers 1340 may have a lesser length than the second fibers 1350. In some embodiments, the first fibers 1340 may form an angle with the second fibers 1350 that ranges from 80-degrees to 100-degrees. The first fibers 1340 and the second fibers 1350 are shown to be arranged in a woven pattern (e.g., a weave, with the first fibers 1340 and the second fibers 1350 at a substantially 90-degree angle) rather than in a braided configuration (e.g., fibers at lesser oblique angles). As shown in FIG. 27, the implant 1300 is shown adjacent an implant 1400. The implant 1300, as described above, includes a woven configuration with fibers arranged at approximately 90-degree angles whereas the implant 1400 (which may be the same and/or similar to one or more implants previously described herein) includes a braided configuration (e.g., fibers arranged at oblique angles less than/greater than 90-degrees). In some embodiments, the implant 1300 may have a width greater than that of the implant 1400 as shown in FIG. 27, while in some embodiments the implant 1300 may have a width lesser than that of the implant 1400.

As shown the first fibers 1340 include two fibers. In some embodiments, the first fibers 1340 may include a resorbable fiber 1342 and a non-resorbable fiber 1344. Upon implantation, the implant 1300 may have a configuration such as that shown in FIGS. 25-26. However, after the implant has been implanted in a patient the resorbable fiber 1342 may be at least partially resorbed (e.g., is formed of a bioresorbable material). As the resorbable fiber 1342 is at least partially resorbed, the non-resorbable fiber 1344 and the second fiber 1350 may expand (e.g., exhibit elastic, resilient properties) into space within the implant 1300 and surrounding area that was previously occupied by at least a portion of the resorbable fiber 1342. As shown, the second fiber 1350 includes a non-resorbable fiber which may be the same as or similar to the non-resorbable fiber 1344. After implantation, the directional behavior of the fibers may correspond to the woven configuration of the implant 1300. For example, if the first fibers 1340 are arranged longitudinally along the length of the implant 1300 and the second fibers 1350 are arranged laterally across the implant 1300, any relaxation of the implant 1300 and fibers thereof may be in substantially the longitudinal direction (e.g., as the resorbable fibers 1342 are at least partially resorbed). Similarly, if the first fibers 1340 are arranged laterally across the width of the implant 1300 and the second fibers 1350 are arranged longitudinally along the length of the implant 1300, any relaxation of the implant 1300 and the fibers thereof may be in substantially the lateral direction.

The implant 1300 as well as the components thereof (e.g., the first fibers 1340, the resorbable fiber 1342, the non-resorbable fiber 1344, the second fibers 1350, etc.) may consist of the same and/or similar materials as shown and described previously in the present disclosure. For example, the implant 1300 and components thereof may consist of the same or similar materials to the implant 100 as shown and described herein. Additionally, the implant 1300 may be implanted and/or implemented using the same and/or similar methods to those shown and described with reference to implants shown and described previously herein. For example, the surgical method 1200 shown and described with reference to FIG. 23 may be applied to the implant 1300.

As may be recognized by those of ordinary skill in the art based on the teachings herein, numerous changes and modifications may be made to the above-described and other embodiments of the present disclosure without departing from the scope of the disclosure. The components of the instruments, guides, implants, plates, and/or systems as disclosed in the specification, including the accompanying abstract and drawings, may be replaced by alternative components or features, such as those disclosed in another embodiment, which serve the same, equivalent or similar purpose as known by those skilled in the art to achieve the same, equivalent or similar results by such alternative components or features to provide a similar function for the intended purpose. In addition, the instruments, guides, implants, plates, and/or systems may include more or fewer components or features than the embodiments as described and illustrated herein. For example, the components and features of various implant materials, branching, apertures, etc. may be used interchangeably and in alternative combinations as would be modified or altered by one of skill in the art. Further, the steps of the surgical method 1200 associated with the implants shown and described with reference to FIGS. 1-27 may be used interchangeably and in alternative combinations as would be modified or altered by one of skill in the art. Accordingly, this detailed description of the currently-preferred embodiments is to be taken as illustrative, as opposed to limiting of the disclosure.

Aspects of the present invention are described herein with reference to flowchart illustrations and/or block diagrams of methods. The flowchart illustrations and/or block diagrams illustrate the functionality and operation of possible implementations of the devices, systems, and methods according to various embodiments of the present invention. In this regard, each block of the flowchart may represent a step, segment, or portion of a process. In some alternative implementations, the functions noted in the blocks may occur out of the order noted in the Figures. For example, two blocks shown in succession may, in fact, be executed substantially concurrently, or the blocks may sometimes be executed in reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements but is not limited to possessing only those one or more steps or elements. Likewise, a step of a method or an element of a device that "comprises," "has," "includes," or "contains" one or more features possesses those one or more features but is not limited to possessing only those one or more features. Furthermore, a device or structure that is configured in a certain way is configured in at least that way but may also be configured in ways that are not listed.

The invention has been described with reference to the preferred embodiments. It will be understood that the operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

What is claimed is:

1. An implant, comprising:
   a first fiber population wherein at least a portion of the first fiber population is
   non-resorbable;
   a second fiber population wherein at least a portion of the second fiber population is
   resorbable
   gaps formed between each group of fibers of the first fiber population and each group of fibers of the second fiber population; and
   a tubular composition extending along a longitudinal axis of the implant, wherein the tubular composition is flattened to include a planar composition comprising:
   a first planar surface of the first fiber population interwoven with the second fiber population; and
   a second planar surface of the first fiber population interwoven with the second fiber population, wherein a side of the first planar surface contacts a side of the second fiber population;
   wherein the first fiber population and the second fiber population are arranged in at least one weave pattern,
   wherein each group of fibers of the second fiber population traverses the gaps between each group of fibers of the first fiber population,
   wherein a greatest length of a non-resorbable fiber of the first fiber population is longitudinally longer than a greatest length of a resorbable fiber of the second fiber population, wherein the non-resorbable fiber is coupled at a first end and a second end of the implant, and the at least one-resorbable fiber is coupled at the first end and the second end of the implant, and wherein the at least one weave pattern extends between the first end and the second end of the implant, and wherein the fibers of the first fiber population are arranged more closely together as the fibers extend along the length between the first end and the second end of the implant than the fibers of the second fiber population as the fibers extend along the length between the first end and the second end of the implant.

2. The implant of claim 1, wherein the second fiber population further comprises:
a first resorbable fiber having a first length; and
a second resorbable fiber having a second length;
wherein the second length is larger than the first length;
wherein the first resorbable fiber has a first resorption rate;
wherein the second resorbable fiber has a second resorption rate that is of a longer time duration than the first resorption rate.

3. The implant of claim 1,
wherein the at least one weave pattern comprises:
the first fiber population interwoven with the second fiber population; and
a capacity to resist dissociation between the first fiber population and the second fiber population.

4. The implant of claim 3, wherein the at least one weave pattern includes at least one of a twill weave, a plain weave, a satin weave, a matt weave, a jacquard weave, a dobby weave, a gauze weave, a rib weave, braiding, matte spinning, felting, and combinations thereof.

5. The implant of claim 1,
wherein the tubular composition has a capacity to provide additional resistance to dissociation for the first fiber population and the second fiber population.

6. The implant of claim 1, further comprising:
an initial range of the second fiber population comprising:
about 1 percent to about 50 percent of the implant's total fiber population; and
a post-resorption range of the second fiber population that is less than the initial range.

7. The implant of claim 1, wherein the at least one each resorbable fiber of the second fiber population:
includes a respective resorption rate.

8. The implant of claim 7, further comprising:
a first composition of the second fiber population, comprising:
a first amount of resorbable fibers;
a second composition of the second fiber population, comprising:
a second amount of resorbable fibers, wherein the second amount of resorbable fibers in the second composition is fewer than the first amount of resorbable fibers in the first composition.

9. The implant of claim 7, wherein the plurality of resorbable fibers comprises:
a first composition of the second fiber population has a first resorption rate; and
a second composition of the second fiber population has a second resorption rate;
wherein the first resorption rate is different than the second resorption rate.

10. The implant of claim 1, further comprising:
a first composition of the first fiber population, wherein the fibers of the first composition are arranged in
a relatively non-extendable weave angle; and
a second composition of the first fiber population wherein the second composition is capable of extending the implant to an extended length that corresponds to a physiological range of motion of at least one joint, wherein the fibers of the second composition are arranged in
an extendable weave angle due to the plurality of gaps;
wherein the extendable weave angle is capable of extending a distance greater than or equal to the relatively non-extendable weave angle.

11. The implant of claim 1, wherein the second fiber population comprises:
at least one resorption rate;
wherein each resorption rate of the at least one resorption rate corresponds to an expected physiological healing rate of a soft tissue member.

12. The implant of claim 1, further comprising:
at least one branch comprising:
a separation of the implant's total fiber population;
a first segment of the at least one branch comprising:
a portion of the first fiber population and a portion of the second fiber population;
a second segment of the at least one branch comprising:
another portion of the first fiber population and another portion of the second fiber population.

13. The implant of claim 12, wherein the first segment is separated from the second segment along at least a portion of a longitudinal length of the implant.

14. The implant of claim 1, further comprising:
at least one aperture comprising:
a rigid fiber material incorporated around an inner circumferential edge of the at least one aperture;
wherein the rigid fiber material is capable of providing an elastic action due to a shape deformity of the rigid fiber material.

15. The implant of claim 14, wherein the at least one aperture comprises a plurality of apertures, each aperture of the plurality of apertures comprising the rigid fiber material disposed around a respective inner circumferential edge of each aperture, and wherein the rigid fiber material of each aperture is capable of accumulating each elastic action to provide an accumulated elastic action that applies greater elastic force to the implant than the elastic action of rigid fiber material of a single aperture.

16. The implant of claim 1, further comprising:
at least one biocompatible material.

17. The implant of claim 16, wherein the at least one biocompatible material includes a plurality of biocompatible materials, and wherein the implant further comprises:
the first fiber population further comprising:
a first biocompatible material; and
the second fiber population further comprising:
a second biocompatible material;
wherein the first biocompatible material is different from the second biocompatible material.

18. The implant of claim 1, wherein the second fiber population further comprises:
a first set of resorbable fibers; and
a second set of resorbable fibers;
wherein the first set of resorbable fibers includes a shorter greatest longitudinal length than the second set of resorbable fibers; and
wherein the first set of resorbable fibers includes a faster resorption rate than the second set of resorbable fibers.

19. The implant of claim 1, wherein the fibers of the first fiber population and the second fiber population are selected from monofilaments, multifilaments, and a combination of monofilaments and multifilaments.

20. The implant of claim 1, wherein the first end of the implant is sealed closed and the second end of the implant is sealed closed.

\* \* \* \* \*